US012420229B2

(12) United States Patent
Kapustin et al.

(10) Patent No.: US 12,420,229 B2
(45) Date of Patent: *Sep. 23, 2025

(54) LOW DEW POINT AIR DEHUMIDIFICATION SYSTEM

(71) Applicant: Water Harvesting, Inc., Newark, CA (US)

(72) Inventors: Ievgen Kapustin, Newark, CA (US); David S. Kuo, Newark, CA (US)

(73) Assignee: Water Harvesting, Inc., Fremont, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 17/963,360

(22) Filed: Oct. 11, 2022

(65) Prior Publication Data

US 2024/0115990 A1 Apr. 11, 2024

(51) Int. Cl.
*B01D 53/04* (2006.01)
*B01D 53/26* (2006.01)

(52) U.S. Cl.
CPC ....... *B01D 53/261* (2013.01); *B01D 53/0438* (2013.01); *B01D 53/0446* (2013.01); *B01D 53/0454* (2013.01); *B01D 53/265* (2013.01); *B01D 2257/80* (2013.01); *B01D 2259/4009* (2013.01)

(58) Field of Classification Search
CPC .... B01D 53/261; B01D 53/265; B01D 53/04; B01D 53/0438; B01D 53/0446; B01D 53/0454; B01D 2257/80; B01D 2259/4009; B01D 2259/40088
USPC .......... 96/109–112, 115, 121, 122, 126–128, 96/130, 131, 143, 146; 34/80, 472, 473
See application file for complete search history.

(56) References Cited

U.S. PATENT DOCUMENTS

| 1,559,762 | A | 11/1925 | Newman |
| 4,180,985 | A | 1/1980 | Northrup, Jr. |
| 4,304,577 | A | 12/1981 | Ito et al. |

(Continued)

FOREIGN PATENT DOCUMENTS

| CA | 3120865 | 7/2023 |
| CN | 102639540 A | 8/2012 |

(Continued)

OTHER PUBLICATIONS

Gleick. Water in Crisis: A Guide to the World's Fresh Water Resources. Chapter 2, pp. 13-24. Aug. 1993, Oxford University Press, New York, USA.

(Continued)

*Primary Examiner* — Frank M Lawrence, Jr.
(74) *Attorney, Agent, or Firm* — Craig R. Miles; CR MILES P.C.

(57) ABSTRACT

Generally, an air dehumidification system useful in dehumidifying gases to produce gases having low dew points. Specifically, an air dehumidifier and methods of making and using an air dehumidifier including a plurality of modules each containing a water capture material which absorbs water from a supply airflow in an adsorption mode and releases water vapor in a desorption mode, wherein one or more of the plurality of modules concurrently operate in the adsorption mode to reduce the dew point of the supply airflow as one or more of the plurality of modules operate in the desorption mode to regenerate the water capture material.

26 Claims, 8 Drawing Sheets

(56) References Cited

U.S. PATENT DOCUMENTS

| | | | |
|---|---|---|---|
| 4,646,541 A | 3/1987 | Reid et al. | |
| 5,565,139 A | 10/1996 | Walker et al. | |
| 5,632,802 A | 5/1997 | Grgich et al. | |
| 5,632,954 A | 5/1997 | Coellner et al. | |
| 5,779,768 A * | 7/1998 | Anand | B01D 53/0462 95/115 |
| 6,074,972 A | 6/2000 | Bratton et al. | |
| 6,334,316 B1 | 1/2002 | Maeda | |
| 6,684,648 B2 | 2/2004 | Faqih | |
| 8,500,886 B2 | 8/2013 | Okano | |
| 8,627,673 B2 | 1/2014 | Hill et al. | |
| 8,864,882 B2 | 10/2014 | Henning et al. | |
| 9,134,038 B2 | 9/2015 | Lee et al. | |
| 9,446,969 B1 | 9/2016 | Redman et al. | |
| 10,168,057 B2 | 1/2019 | Goldsworthy et al. | |
| 10,266,737 B2 | 4/2019 | Van Horn et al. | |
| 10,695,741 B2 | 6/2020 | Motkuri et al. | |
| 10,829,913 B1 | 11/2020 | Ahmed et al. | |
| 10,857,855 B2 | 12/2020 | Tomita et al. | |
| 10,948,202 B2 | 3/2021 | Lee et al. | |
| 11,029,045 B2 | 6/2021 | Woods et al. | |
| 11,065,573 B2 | 7/2021 | Matuska et al. | |
| 11,679,339 B2 | 6/2023 | Van de Mortel | |
| 12,000,122 B2 | 6/2024 | Yaghi et al. | |
| 12,098,530 B1 * | 9/2024 | Kapustin | E03B 3/28 |
| 12,151,199 B2 * | 11/2024 | Kuo | B01D 5/0039 |
| 2004/0040172 A1 * | 3/2004 | Crawford | F26B 21/083 34/473 |
| 2004/0107832 A1 | 6/2004 | Tongue et al. | |
| 2004/0123615 A1 | 7/2004 | Yabu | |
| 2004/0123616 A1 | 7/2004 | Lee et al. | |
| 2004/0244398 A1 | 12/2004 | Radermacher et al. | |
| 2005/0044862 A1 | 3/2005 | Vetrovec et al. | |
| 2005/0172805 A1 * | 8/2005 | Motono | B01D 53/261 96/125 |
| 2006/0130652 A1 | 6/2006 | Takewaki et al. | |
| 2007/0028769 A1 | 2/2007 | Eplee et al. | |
| 2009/0139254 A1 | 6/2009 | Landry | |
| 2009/0151368 A1 | 6/2009 | Bar | |
| 2009/0260385 A1 | 10/2009 | Hill et al. | |
| 2010/0126344 A1 | 5/2010 | Stein et al. | |
| 2010/0175557 A1 | 7/2010 | Shih et al. | |
| 2010/0319371 A1 * | 12/2010 | Bellemo | F25J 3/04775 62/93 |
| 2011/0017061 A1 * | 1/2011 | Carlsson | B01D 53/0462 95/122 |
| 2011/0056220 A1 | 3/2011 | Caggiano | |
| 2011/0088552 A1 | 4/2011 | Ike et al. | |
| 2011/0296858 A1 | 12/2011 | Caggiano | |
| 2012/0172612 A1 | 7/2012 | Yaghi et al. | |
| 2013/0036913 A1 | 2/2013 | Fukudome | |
| 2013/0061752 A1 | 3/2013 | Farha et al. | |
| 2013/0192281 A1 | 8/2013 | Nam et al. | |
| 2013/0269522 A1 | 10/2013 | DeValve | |
| 2013/0312451 A1 | 11/2013 | Max | |
| 2014/0138236 A1 | 5/2014 | White | |
| 2014/0165637 A1 | 6/2014 | Ma | |
| 2014/0260967 A1 * | 9/2014 | Gitschlag | B01D 53/0462 95/41 |
| 2014/0287150 A1 | 9/2014 | Miljkovic et al. | |
| 2014/0326133 A1 | 11/2014 | Wang et al. | |
| 2014/0338425 A1 | 11/2014 | Kalbassi et al. | |
| 2016/0030858 A1 | 2/2016 | Giacomini | |
| 2016/0084541 A1 | 3/2016 | Aguado et al. | |
| 2016/0334145 A1 | 11/2016 | Pahwa et al. | |
| 2017/0008915 A1 | 1/2017 | Yaghi et al. | |
| 2017/0113184 A1 | 4/2017 | Eisenberger | |
| 2017/0129307 A1 | 5/2017 | Zhou et al. | |
| 2017/0211851 A1 | 7/2017 | Feng et al. | |
| 2017/0234576 A1 | 8/2017 | Kawagoe et al. | |
| 2017/0292737 A1 | 10/2017 | Moon | |
| 2017/0354920 A1 | 12/2017 | Switzer et al. | |
| 2018/0043295 A1 * | 2/2018 | Friesen | B01D 53/14 |
| 2018/0171604 A1 | 6/2018 | Kim et al. | |
| 2018/0209123 A1 | 7/2018 | Bahrami et al. | |
| 2018/0261882 A1 | 9/2018 | Chang et al. | |
| 2019/0100903 A1 | 4/2019 | Panda et al. | |
| 2019/0234053 A1 | 8/2019 | Kim et al. | |
| 2019/0323714 A1 | 10/2019 | Cui | |
| 2020/0009497 A1 | 1/2020 | Matuska et al. | |
| 2020/0182734 A1 | 6/2020 | Ueno et al. | |
| 2020/0206679 A1 | 7/2020 | Stuckenberg | |
| 2020/0283997 A1 | 9/2020 | Salloum et al. | |
| 2020/0316514 A1 | 10/2020 | Fuchs et al. | |
| 2020/0363078 A1 | 11/2020 | Mulet et al. | |
| 2021/0062478 A1 | 3/2021 | Friesen et al. | |
| 2021/0156124 A1 | 5/2021 | Yaghi et al. | |
| 2021/0237535 A1 | 8/2021 | Goel et al. | |
| 2021/0283528 A1 | 9/2021 | Pokorny et al. | |
| 2021/0283574 A1 | 9/2021 | Yaghi et al. | |
| 2021/0394114 A1 * | 12/2021 | Schmaelzle | B01D 53/261 |
| 2022/0001328 A1 * | 1/2022 | Yoon | B01D 53/04 |
| 2022/0106203 A1 | 4/2022 | Marchon et al. | |
| 2022/0170247 A1 | 6/2022 | Yaghi et al. | |
| 2022/0389691 A1 | 12/2022 | Kuo et al. | |
| 2023/0063572 A1 | 3/2023 | Kapustin | |
| 2023/0264138 A1 | 8/2023 | McGrail et al. | |

FOREIGN PATENT DOCUMENTS

| | | |
|---|---|---|
| CN | 106029674 A | 10/2016 |
| CN | 205718197 | 11/2016 |
| CN | 1077722290 A | 2/2018 |
| CN | 114182784 A | 3/2022 |
| CZ | 2018-337 | 7/2019 |
| EP | 0816225 A1 | 1/1998 |
| EP | 2507247 A1 | 10/2012 |
| EP | 3721971 A1 | 10/2020 |
| GB | 2540798 A | 2/2017 |
| JP | S63-107720 A | 5/1988 |
| JP | 2013-512223 A | 4/2013 |
| JP | 2017-509607 A | 4/2017 |
| JP | 2018080146 A | 5/2018 |
| WO | WO 03/097216 A1 | 11/2003 |
| WO | 2015/127033 A1 | 8/2015 |
| WO | WO2016/186454 A1 | 11/2016 |
| WO | WO 2018/118377 A1 | 6/2018 |
| WO | WO 2018/230430 A1 | 12/2018 |
| WO | WO 2019/010102 A1 | 1/2019 |
| WO | WO 2019/058158 A1 | 3/2019 |
| WO | WO 2019/082000 A1 | 5/2019 |
| WO | WO 2019/152962 A2 | 8/2019 |
| WO | WO 2020/036905 A1 | 2/2020 |
| WO | WO 2020/099561 A1 | 5/2020 |
| WO | WO 2020/112899 A1 | 6/2020 |
| WO | WO 2020/154427 A1 | 7/2020 |
| WO | WO 2021/034477 A1 | 2/2021 |
| WO | WO 2021/067179 A1 | 4/2021 |
| WO | WO 2021/162894 A1 | 8/2021 |
| WO | WO 2023/146800 A1 | 8/2023 |
| WO | WO 2023/181058 A1 | 9/2023 |

OTHER PUBLICATIONS

PCT International Patent Application No. PCT/US22/41142, International Search Report and Written Opinion of the International Searching Authority dated Jan. 20, 2023, 12 pages.
PCT International Patent Application No. PCT/US23/33098, International Search Report and Written Opinion of the International Searching Authority dated Nov. 30, 2023, 11 pages.
U.S. Appl. No. 17/424,147, Office Action mailed Oct. 2, 2023.
Brazilian Patent Application No. BR112021010139-0, Office Action mailed Jul. 9, 2023, 4 pages.
Brazilian Patent Application No. BR112021002648-7, Office Action mailed Jul. 3, 2023, 4 pages.
Canadian Patent Application No. 3,171,282, Office Action dated Oct. 27, 2023, 11 pages.
Canadian Patent Application No. 3,167,734, Office Action dated Aug. 31, 2023, 6 pages.
Philippine Patent Application No. 1/2021/551201, Substantive Examination Report dated Sep. 6, 2023, 6 pages.

(56) References Cited

OTHER PUBLICATIONS

European Patent Application No. 21754205.9, Extended European Search Report mailed Apr. 19, 2024. 8 pages.
Singapore Patent Application No. 11202252723Y, Office Action mailed Oct. 31, 2024, 8 pages.
European Patent Application No. EP 19891188.5, Office Action dated Jan. 26, 2024, 7 pages.
European Patent Application No. EP 19891188.5, Response to Office Action filed Apr. 9, 2024, 14 pages.
Lu et al. Tuning the structure and function of metal-organic frameworks via linker design. Chemical Society Reviews, Jan. 2014, 43(16):5561-5593.
PCT International Patent Application No. PCT/US23/33101, International Search Report and Written Opinion of the International Searching Authority dated Feb. 8, 2024, 16 pages.
U.S. Appl. No. 17/763,413, Office Action mailed Feb. 6, 2024.
U.S. Appl. No. 18/077,417, Office Action mailed Mar. 29, 2024.
U.S. Appl. No. 18/371,700, Office Action mailed Apr. 18, 2024.
Janiak et al. Solid-Solution Mixed-Linker Synthesis of Isoreticular Al-Based MOFs for and Easy Hydrophilicity Tuning in Water-Sorption Heat Transformations. Chem. Mater., May 2019, 31, 11, 4051-4062.
Fang et al. One-Pot Synthesis of Two-Linker Mixed Al-Based Metal-Organic Frameworks for Modulated Water Vapor Adsorption. Cryst. Growth Des., Aug. 2020, 20, 10, 6565-6572.
Global Cooling Prize. Transaera and partner Haier. Website, https://globalcoolingprize.org/transaera-inc/, originally downloaded Nov. 21, 2022, 3 pages.
PCT International Patent Application No. PCT/US19/63442, International Search Report and Written Opinion of the International Searching Authority dated Jan. 22, 2020, 7 pages.
PCT International Patent Application No. PCT/US20/14647, International Search Report and Written Opinion of the International Searching Authority dated May 5, 2020, 11 pages.
PCT International Patent Application No. PCT/US20/53052, International Search Report and Written Opinion of the International Searching Authority dated Jan. 4, 2021, 10 pages.
PCT International Patent Application No. PCT/US21/16261, International Search Report and Written Opinion of the International Searching Authority dated Apr. 16, 2021, 8 pages.
PCT International Patent Application No. PCT/US21/47491, International Search Report and Written Opinion of the International Searching Authority dated Dec. 7, 2021, 9 pages.
PCT International Patent Application No. PCT/US22/12990, International Search Report and Written Opinion of the International Searching Authority dated Apr. 7, 2021, 14 pages.
PCT International Patent Application No. PCT/US22/26153, International Search Report and Written Opinion of the International Searching Authority dated Jul. 28, 2022, 18 pages.
Ding et al. Carbon capture and conversion using metal-organic frameworks and MOF-based materials. Chem. Soc. Rev., May 2019, 48(2):2783-2828.
Fracaroli et al. Metal-Organic Frameworks with Precisely Designed Interior for Carbon Dioxide Capture in the Presence of Water. Am. Chem. Soc., Jun. 2014, 136, pp. 8863-8866.
Furukawa et al. Water Adsorption in Porous Metal-Organic Frameworks and Related Materials. J. Am. Chem. Soc., Mar. 2014, 136(11): 4369-4381.
Hanikel et al. Rapid Cycling and Exceptional Yield in a Metal-Organic Frameworks for Water Harvester. ACS Cent. Sci., Aug. 2019, 5(10):1699-1706.
Kalmutzki et al. Metal-Organic Frameworks for Water Harvesting from Air; Adv. Mater. Sep. 2018, 30(37):1704304.
Kim et al. Water harvesting from air with metal-organic frameworks powered by natural sunlight. Science, Apr. 2017, 356:430-434.
Kummer et al. A functional full-scale heat exchanger coated with aluminum fumarate metal-organic framework for adsorption heat transformation. Ind. Eng. Chem. Res., Jul. 2017, 56(29):8393-8398.
Li et al. Incorporation of Alkylamine into Metal-Organic Frameworks through a Brønsted Acid-Base Reaction for $CO_2$ Capture. ChemSusChem., Oct. 2016, 9(19):2832-2840.
Tu et al. Progress and Expectation of Atmospheric Water Harvesting. Joule, Aug. 2018, 2(8):1452-1478.
Zhou et al. Atmospheric Water Harvesting: A Review of Material and Structural Designs. ACS Materials Lett., May 2020, 2(7):671-684.
PCT International Patent Application No. PCT/IN23/50258, International Search Report and Written Opinion of the International Searching Authority dated Jul. 4, 2023, 10 pages.
Japanese Patent Application No. 2021-529709, Office Action dated Nov. 21, 2023, 6 pages.
U.S. Appl. No. 18/384,992, Office Action mailed Jan. 23, 2024.
U.S. Appl. No. 18/077,417, Office Action mailed Jan. 17, 2024.
Canivet et al. Water adsorption in MOFs: fundamentals and applications. Chem. Soc. Rev., Aug. 2014, 43(16):5594-5617.
Clus et al. Study of dew water collection in humid tropical islands. Hydrol., Oct. 2008, 361(1-2):159-171.
Fathieh et al. Practical water production from desert air. Sci. Adv., Jun. 2018, 4(6):eaat3198.
Klemm et al. Fog as a Fresh-Water Resource: Overview and Perspectives. Ambio, May 2012, 41(3):221-234.
Lee et al. Water harvest via dewing. Langmuir, Jun. 2012, 28(27):10183-10191.
Muselli et al. Dew water collector for potable water in Ajaccio (Corsica Island, France). Atmos. Res., Sep. 2002,64,297-312.
Park et al. Optimal Design of Permeable Fiber Network Structures for Fog Harvesting. Langmuir, Oct. 2013, 29(43):13269-13277.
Schemenauer et al. A Proposed Standard Fog Collector for Use in High-Elevation Regions. Appl. Meteorol., Nov. 1994, 33(11):1313-1322.
Wahlgren. Atmospheric Water Vapour Processor Designs for Potable Water Production: A Review. Water Res., Jan. 2001, 35(1):1-22.

\* cited by examiner

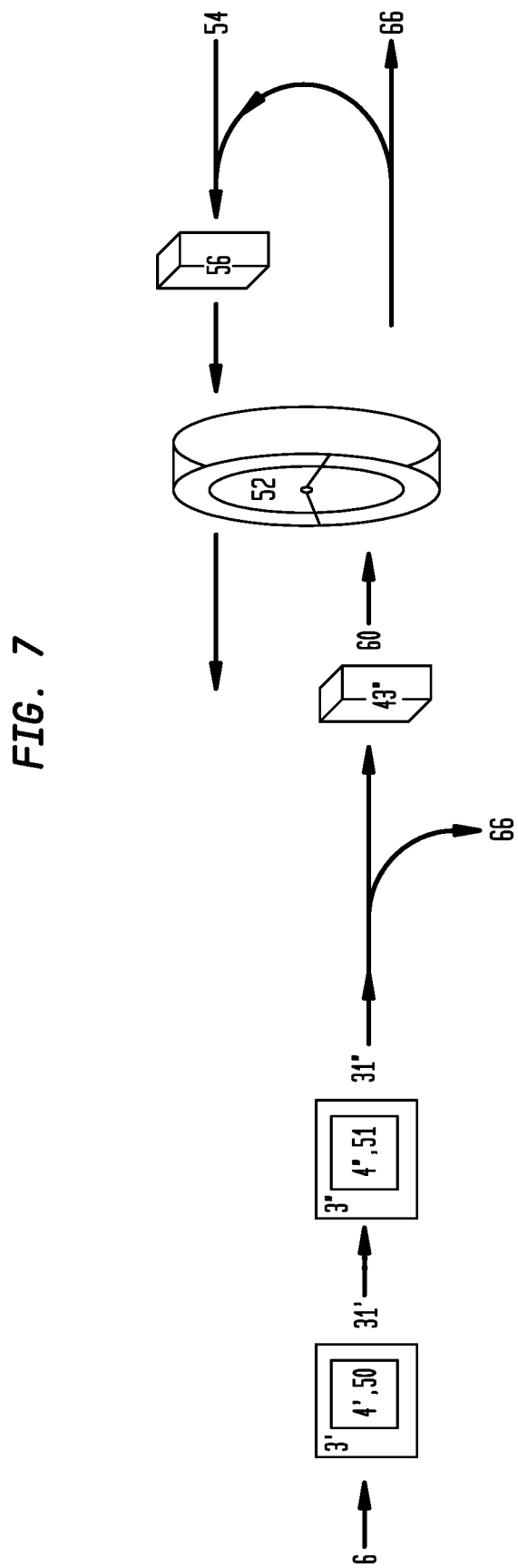

LOW DEW POINT AIR DEHUMIDIFICATION SYSTEM

I. FIELD OF THE INVENTION

Generally, an air dehumidification system useful in dehumidifying gases to produce gases having low dew points. Specifically, an air dehumidifier and methods of making and using an air dehumidifier including a plurality of modules each containing a water capture material which absorbs water from a supply airflow in an adsorption mode and releases water vapor in a desorption mode, wherein one or more of the plurality of modules concurrently operate in the adsorption mode to reduce the dew point of the supply airflow as one or more of the plurality of modules operate in the desorption mode to regenerate the water capture material.

II. BACKGROUND

Many conventional processes such as: the manufacture of medical devices, semiconductors, lithium-ion batteries, pharmaceuticals, and compressed gas production require supply airflow, make-up airflow and/or recirculated airflow having low dew points consistent with the manufacturing or production process. In addition, emerging technologies such as carbon dioxide capture from ambient air or from flue gas rely on dehumidification of gases prior to carbon dioxide capture. Particular processes necessitate supply airflow, make-up airflow, or recirculated airflow having a dew point in a range of −40° C. (about −40° F.) to −70° C. (about −94° F.).

In dry rooms, airflow is controlled in temperature and humidity. Humidity of the airflow can be controlled by dehumidification of the make-up outdoor airflow and the recirculated indoor airflow. Conventionally, make-up outdoor airflow is pre-cooled to remove a portion of the water. Pre-cooling of the make-up outdoor airflow is followed by a water adsorption process using a solid desiccant, such as silica gel, that can be incorporated in a desiccant wheel. The partially dehumidified outdoor make-up airflow can then be mixed with the indoor recirculated airflow. The resulting mixed airflow can again be pre-cooled and dehumidified using a solid desiccant, such as, a zeolite. The temperature of the dehumidified mixed air can be controlled prior to discharge into the dry room.

There are substantial disadvantages to using desiccants such as silica gel or zeolites for dehumidification of outdoor make-up airflow or outdoor make-up airflow mixed with indoor recirculated airflow because the desiccant must be regenerated by removal of the absorbed water at elevated temperatures. For example, regeneration of desiccants incorporated into a desiccant wheel can be achieved by moving a large volume of heated air across the desiccant layer of the desiccant wheel. Typically, the air is heated using natural gas or resistive heating or combination thereof. The substantial disadvantage of this solution to regenerate desiccants is the expenditure of the substantial amount of energy to heat air to a temperature above 200° C. (about 392° F.).

There would be a substantial advantage in a dehumidification system or air dehumidifier configured to dehumidify gases such as: ambient airflow, outdoor make-up airflow, indoor recirculated airflow, flue gases, or combinations thereof, which by comparison to regeneration of desiccants such as silica gels or zeolites reduces or cancels the energy cost to regenerate the dehumidification sorbent.

III. SUMMARY OF THE INVENTION

Provided herein are air dehumidification systems and air dehumidifiers that operate to discharge airflow having low dew points that meet the requirements of a numerous and wide variety of processes, and in particular embodiments, concurrently reduce the overall energy costs attributable to dehumidification of the supply airflow as compared to conventional dehumidification systems or air dehumidifiers.

A broad object of particular embodiments of the invention can be to provide an air dehumidification system or air dehumidifier including a plurality of modules each containing a water capture material that adsorbs water from a supply airflow in an adsorption mode of the air dehumidification system or air dehumidifier; a first chamber configured to fluidically couple to one or more of the plurality of modules; and a heating source thermally coupled to the first chamber, wherein the heating source operates to heat an airflow recirculated between the first chamber fluidically coupled to one or more of said plurality of modules to desorb water vapor from the water capture material during a desorption mode of the air dehumidification system or air dehumidifier, wherein one or more of said plurality of modules concurrently operates in the adsorption mode as one or more of the plurality of modules operates in the desorption mode. In particular embodiments, a second chamber can be fluidically coupled to the first chamber; and a cooling source can be thermally coupled to the second chamber, wherein the cooling source operates to cool the airflow recirculated between the first chamber and the second chamber to condense the water vapor during a condensation mode of the air dehumidification system or air dehumidifier. In particular embodiments the heating source and the cooling source can comprise the condenser and the evaporator of a heat pump.

Another broad object of embodiments of the invention can be to provide an air dehumidification system or air dehumidifier including a plurality of modules each containing a water capture material, wherein each of the plurality of modules can be fluidically coupled to an adsorption airflow inlet and an adsorption airflow outlet, wherein the adsorption airflow inlet and the adsorption airflow outlet remain open during the adsorption mode, and wherein each of the plurality of modules can be fluidically coupled to a desorption airflow inlet and a desorption airflow outlet, wherein the desorption airflow inlet and the desorption airflow outlet remain open and the adsorption airflow inlet and said adsorption airflow outlet remain closed during the desorption mode. In particular embodiments, the plurality of modules can be fluidically coupled to receive a supply airflow in parallel, or can be fluidically coupled to receive a supply airflow in an ordered series, and in particular variations, the plurality of modules in the adsorption mode can be fluidically coupled in series to deliver the supply airflow from a first of the plurality of modules containing water capture material having greatest water saturation to a last of the plurality of modules containing water capture material having least water saturation. In particular embodiments, a controller containing an operating specification can be executed to control operation of a valved adsorption airflow inlet, a valved adsorption airflow outlet, a valved desorption airflow inlet, and a valved desorption airflow outlet of each of the plurality of modules, wherein the controller can operate to close the valved adsorption airflow inlet and the valved adsorption airflow outlet, and to open the valved desorption airflow inlet and the valved desorption airflow outlet to fluidically couple one of said plurality of modules to a first chamber during the desorption mode, and wherein the controller can operate to open the valved adsorption airflow inlet and the valved adsorption airflow outlet and close the valved desorption airflow inlet and the valved desorption airflow outlet of the plurality of modules in the adsorption mode.

Another broad object of particular embodiments of the invention can be to provide a method of making an air dehumidification system or an air dehumidifier comprising configuring a plurality of modules to contain a water capture material, wherein the water capture material adsorbs water from a supply airflow in an adsorption mode; fluidically coupling one or more of the plurality of modules to a first chamber; and thermally coupling a heating source to the first chamber, wherein the heating source operates to heat an airflow recirculated between the first chamber fluidically coupled to one or more of the plurality of modules to desorb water vapor from the water capture material during a desorption mode, wherein one or more of the plurality of modules in the adsorption mode adapted to concurrently operate as one or more of the plurality of modules operates in the desorption mode. The method can further include fluidically coupling a second chamber to said first chamber; and thermally coupling a cooling source to the second chamber, the cooling source operable to cool the airflow recirculated between the first chamber and the second chamber to condense the water vapor during a condensation mode of the dehumidification system or an air dehumidifier. The method can further include fluidically coupling each of the plurality of modules to an adsorption airflow inlet and an adsorption airflow outlet, wherein the adsorption airflow inlet and the adsorption airflow outlet remain open during the adsorption mode, and fluidically coupling each of the plurality of modules to a desorption airflow inlet and a desorption airflow outlet, wherein the desorption airflow inlet and the desorption airflow outlet remain open and the adsorption airflow inlet and said adsorption airflow outlet remain closed during the desorption mode. The method can further include fluidically coupling the plurality of modules to receive a supply airflow in parallel, or fluidically coupling the plurality of modules to receive a supply airflow in an ordered series, and in particular variations, fluidically coupling the plurality of modules in the adsorption mode in series to deliver the supply airflow from a first of the plurality of modules containing water capture material having greatest water saturation to a last of the plurality of modules containing water capture material having least water saturation. In particular embodiments the method can further include configuring a controller to control operation of a valved adsorption airflow inlet, a valved adsorption airflow outlet, a valved desorption airflow inlet, and a valved desorption airflow outlet of each of the plurality of modules, wherein the controller can operate to close the valved adsorption airflow inlet and the valved adsorption airflow outlet, and to open the valved desorption airflow inlet and the valved desorption airflow outlet to fluidically couple one of said plurality of modules to a first chamber during the desorption mode, and wherein controller can operate to open the valved adsorption airflow inlet and the valved adsorption airflow outlet and close the valved desorption airflow inlet and the valved desorption airflow outlet of said plurality of modules in said adsorption mode.

Another broad object of particular embodiments of the invention can be a method of using an air dehumidification system or an air dehumidifier including delivering a supply airflow to a plurality of modules each containing a water capture material, wherein the water capture material adsorbs water from the supply airflow in an adsorption mode to reduce a dew point of the supply airflow; fluidically coupling a first chamber to one or more of the plurality of modules; operating a heat source thermally coupled to the first chamber fluidically coupled to one or more of the plurality of modules; heating an airflow recirculated between the first chamber fluidically coupled to one or more of said plurality of modules to desorb water vapor from the water capture material during a desorption mode; and concurrently operating one or more of said plurality of modules in the adsorption mode as one or more of said plurality of modules operates in the desorption mode. The method can further include fluidically coupling a second chamber to said first chamber; thermally coupling a cooling source to the second chamber; and operating the cooling source to cool the airflow recirculated between said first chamber and said second chamber; and condensing the water vapor during a condensation mode of the air dehumidification system or an air dehumidifier. In particular embodiments, the method can include operating a heat pump configured to provide a condenser as the heating source thermally coupled to the first chamber and/or operating a heat pump configured to provide an evaporator as the cooling source thermally coupled to the second chamber. The method can further include delivering the supply airflow through the plurality modules in absorption mode in parallel, or in an ordered series from a first of said plurality of modules containing water capture material having greatest water saturation to a last of said plurality of modules containing water capture material having least water saturation. The method can further include discharging an airflow from the plurality of modules having a dewpoint in the range of about $-30°$ C. (about $-22°$ F.) to about $-70°$ C. ($-94°$ F.), and/or having an absolute humidity in the range of about $0.0035$ g/m$^3$ to about $0.3500$ g/m$^3$ and/or a relative humidity in the range of about $0.02\%$ to about $20\%$.

Another broad object of particular embodiments of the invention can be to incorporate embodiments of an air dehumidification system or air dehumidifier into conventional air dehumidification processes or replace conventional dehumidification processes in whole or in part with embodiments of an air dehumidification system or air dehumidifier including a plurality of modules each containing a water capture material that adsorbs water from a supply airflow in an adsorption mode of the air dehumidification system or air dehumidifier; a first chamber configured to fluidically couple to one or more of the plurality of modules; and a heating source thermally coupled to the first chamber, wherein the heating source operates to heat an airflow recirculated between the first chamber fluidically coupled to one or more of said plurality of modules to desorb water vapor from the water capture material during a desorption mode of the air dehumidification system or air dehumidifier, wherein one or more of said plurality of modules can concurrently operates in the adsorption mode as one or more of the plurality of modules operates in said desorption mode. In particular embodiments, a second chamber can be fluidically coupled to the first chamber; and a cooling source can be thermally coupled to said second chamber, wherein the cooling source operates to cool the airflow recirculated between the first chamber and the second chamber to condense the water vapor during a condensation mode of the air dehumidification system or air dehumidifier. In particular embodiments, the air dehumidification system or air dehumidifier can be fluidically coupled to a pre-cooler operable to reduce water in the supply air prior to deliver to the plurality of modules and/or can be fluidically coupled to a pre-cooler or a desiccant which receives the discharge airflow from the plurality of modules.

Naturally, further objects of the invention are disclosed throughout other areas of the specification, drawings, photographs, and claims.

IV. BRIEF DESCRIPTION OF THE DRAWINGS

Figure 3A:
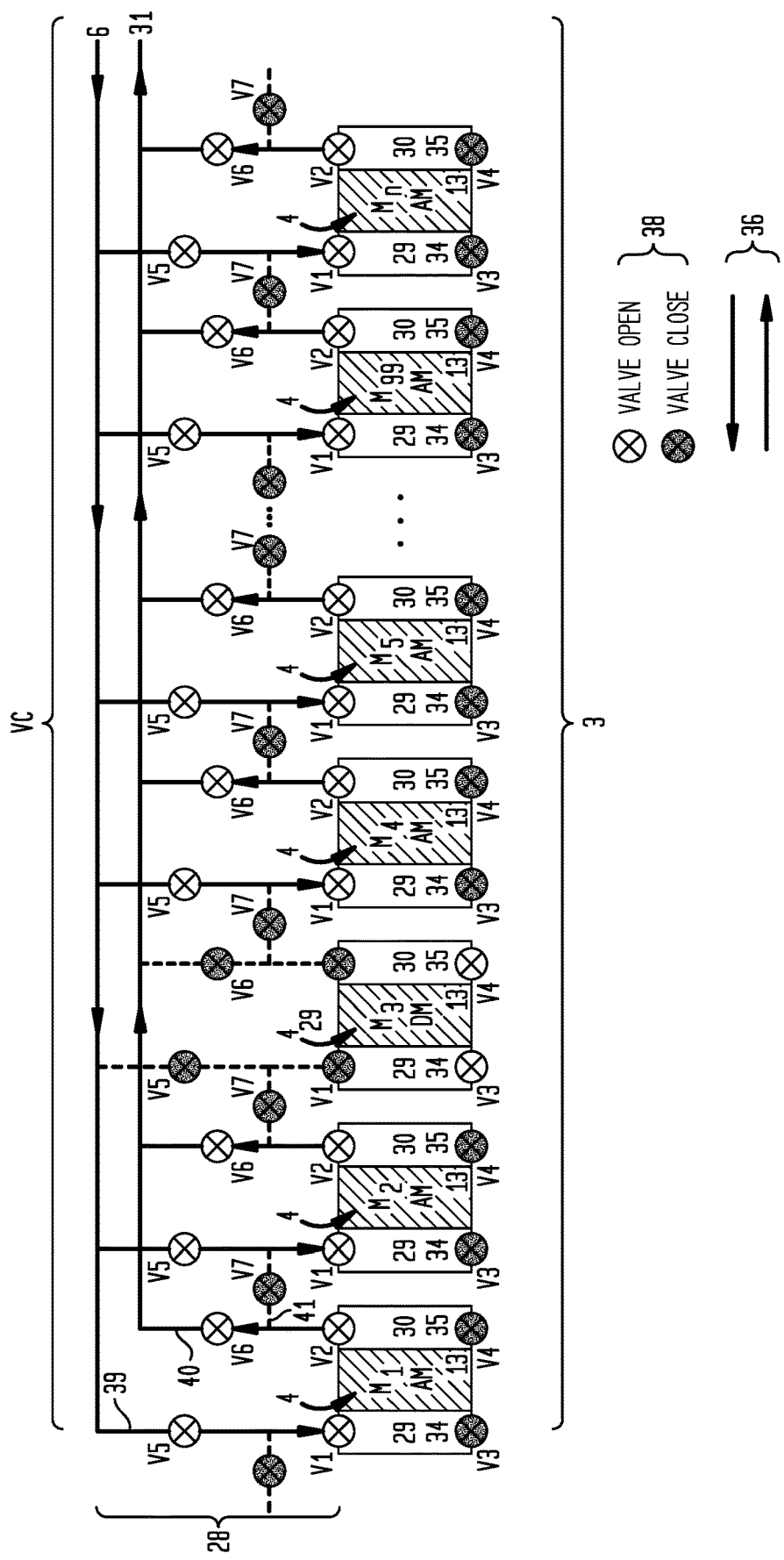

FIG. 3A is block flow diagram of plurality of modules in a particular embodiment of an air dehumidification system having at least one of the plurality of modules in a desorption mode (M3) and the remaining ones of the plurality of modules in the adsorption mode (M1, M2, and M4 through Mn) with a valved conduit configured to deliver supply air in parallel to each of the plurality of modules (M1, M2, and M4 through Mn) in the adsorption mode.

Figure 3B:
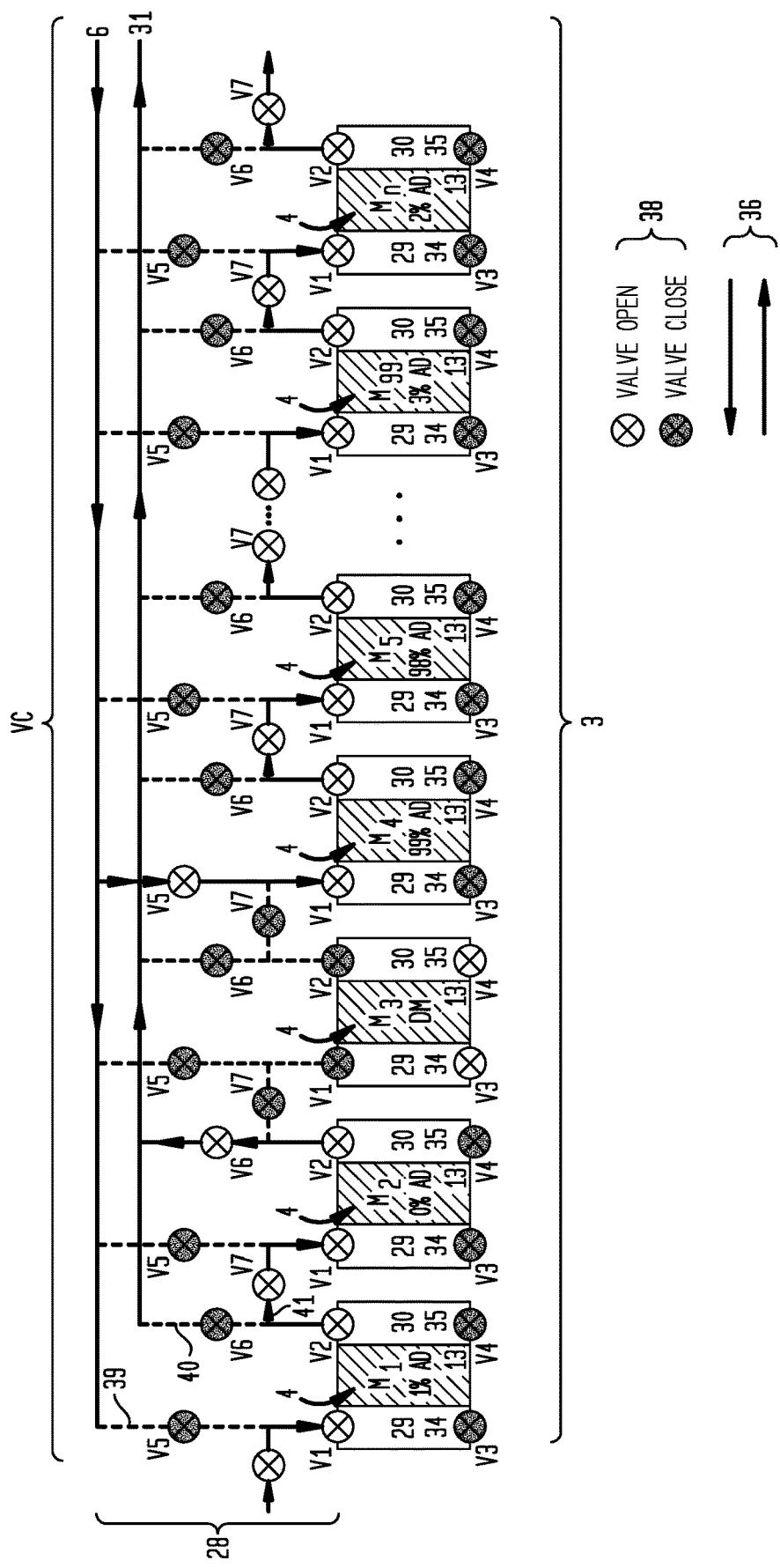

FIG. 3B is block flow diagram of plurality of modules in a particular embodiment of an air dehumidification system having at least one of the plurality of modules in a desorption mode (M3) and the remaining ones of the plurality of modules in the adsorption mode (M1, M2, and M4 through Mn) with a valved conduit configured to deliver supply air in series to each of the plurality of modules (M1, M2, and M4 through Mn) in the adsorption mode.

Figure 3C:
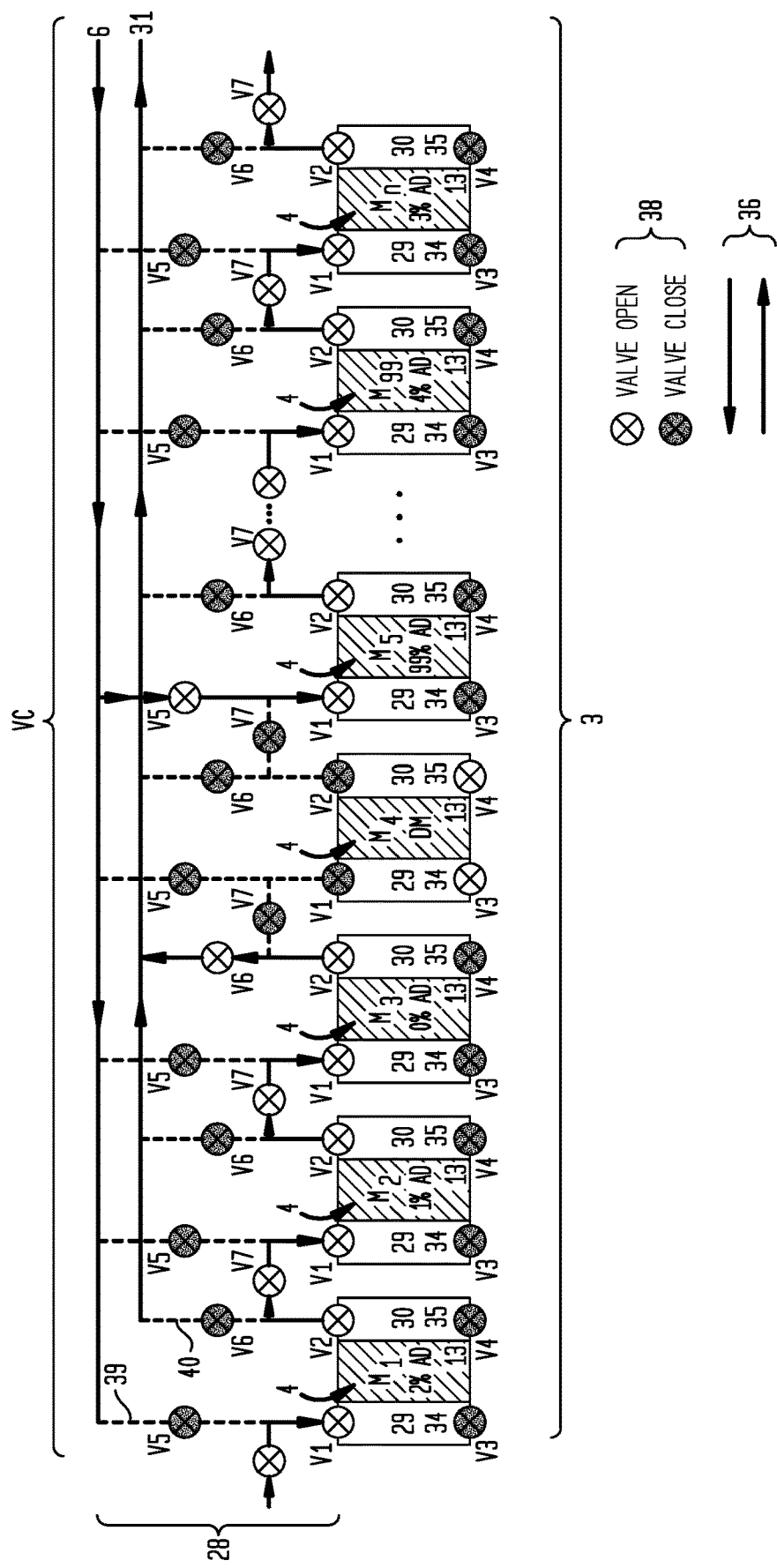

FIG. 3C is block flow diagram of plurality of modules in a particular embodiment of an air dehumidification system depicting a switch of the least one of the plurality of modules in a desorption mode from module M3 to module M4 with the remaining ones of the plurality of modules in the adsorption mode (M1, M2, M3 and M5 through Mn) with a valved conduit configured to deliver supply air in series to each of the plurality of modules (M1, M2, M3 and M5 through Mn) in the adsorption mode.

Figure 4:
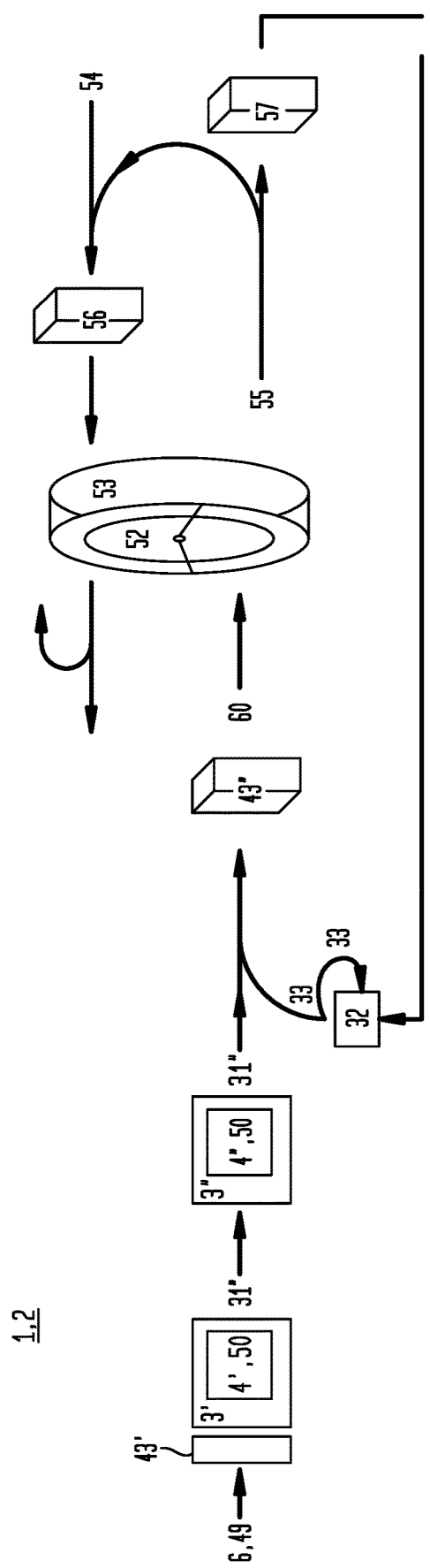

FIG. 4 is a block flow diagram of a particular embodiment of an air dehumidification system useful in conditioning outdoor make-up airflow and/or recirculated indoor airflow to reduce the relative humidity and dew point of the discharge airflow to levels compatible with requirements of dry rooms used for the production of semiconductors and lithium-ion batteries.

Figure 5:
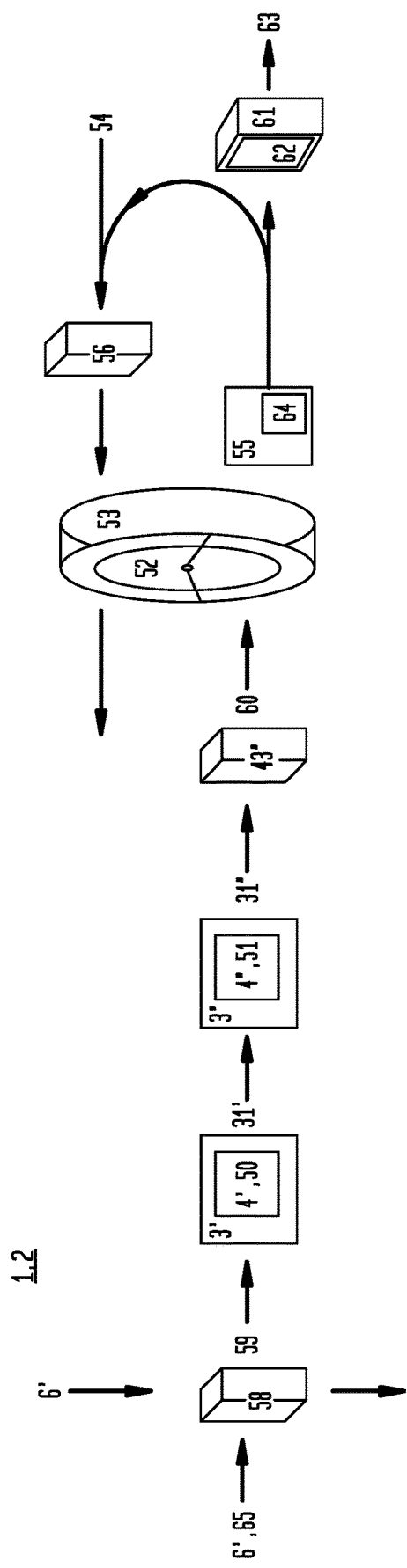

FIG. 5 is a block flow diagram of a particular embodiment of an air dehumidification system useful in conditioning flue gas to reduce the relative humidity and dew point of the discharge airflow to levels compatible with carbon dioxide capture systems.

Figure 6:
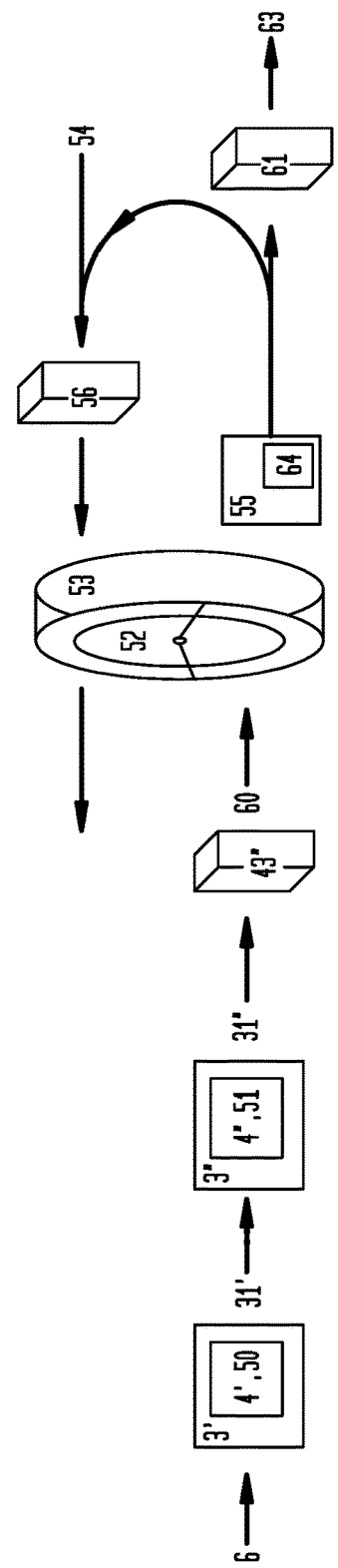

FIG. 6 is a block flow diagram of a particular embodiment of an air dehumidification system useful in conditioning ambient atmosphere to reduce the relative humidity and dew point of the discharge airflow to levels compatible with carbon dioxide capture systems.

FIG. 7 is a block flow diagram of a particular embodiment of an air dehumidification system useful in conditioning ambient atmosphere to reduce the relative humidity and dew point of the discharge airflow to levels compatible with the production of compressed gases.

V. DETAILED DESCRIPTION OF THE INVENTION

The following description sets forth illustrative examples of an air dehumidification system (1) (also referred to as the "system") including particular embodiments of an air dehumidifier (2), methods of making an air dehumidifier (2), and methods of using an air dehumidifier (2). It should be recognized, however, that the examples of the air dehumidification system (1), the air dehumidifier (2) and methods of making and using an air dehumidifier (2) provided by the description are not intended to limit the breadth or scope of the description, but instead to provide examples sufficient for a person of ordinary skill in the art to make and use the full breadth and scope of the invention.

Now, with primary reference to FIGS. 1 through 7, embodiments of the air dehumidification system (1) or the air dehumidifier (2) can include one or more of: a plurality of modules (3) each containing a water capture material (4) which adsorbs water (5) from a supply airflow (6) in an adsorption mode (AM) of the dehumidification system (1) or the air dehumidifier (2); a first chamber (7) thermally coupled to a heating source (8), wherein the first chamber (7) can be fluidically coupled to one or more of the plurality of modules (3) to heat the water capture material (4) to desorb water vapor (9) from the water capture material (4) during a desorption mode (DM) of the dehumidification system (1) or the air dehumidifier (2); a second chamber (10) can be fluidically coupled to the first chamber (7), wherein the water vapor (9) desorbed from the water capture material (4) can be carried by a recirculated airflow (11) between said first chamber (7) and the second chamber (10); and a cooling source (12) thermally coupled to the second chamber (10), wherein the cooling source (12) cools the water vapor (9) recirculated between the first chamber (7) and the second chamber (10), wherein the water vapor (9) recirculated between the first chamber (7) and the second chamber (10) condenses during a condensation mode (CM) of the dehumidification system (1) or the air dehumidifier (2). The term "supply airflow (6)" broadly encompasses a mixture of gases passed through one or more of the plurality of modules (4), and in particular, can include ambient atmosphere, outdoor make-up air, recirculated indoor air, pre-cooled ambient atmosphere or pre-cooled make-up air, or partially dehumidified air, flue gases, or combinations thereof. The term "recirculated airflow (11)" broadly encompasses a mixture of gases recirculated between the first chamber (7) and the second chamber (10). It is intended that each of the described or enumerated elements of the invention can stand alone or in various combinations.

Figure 1:
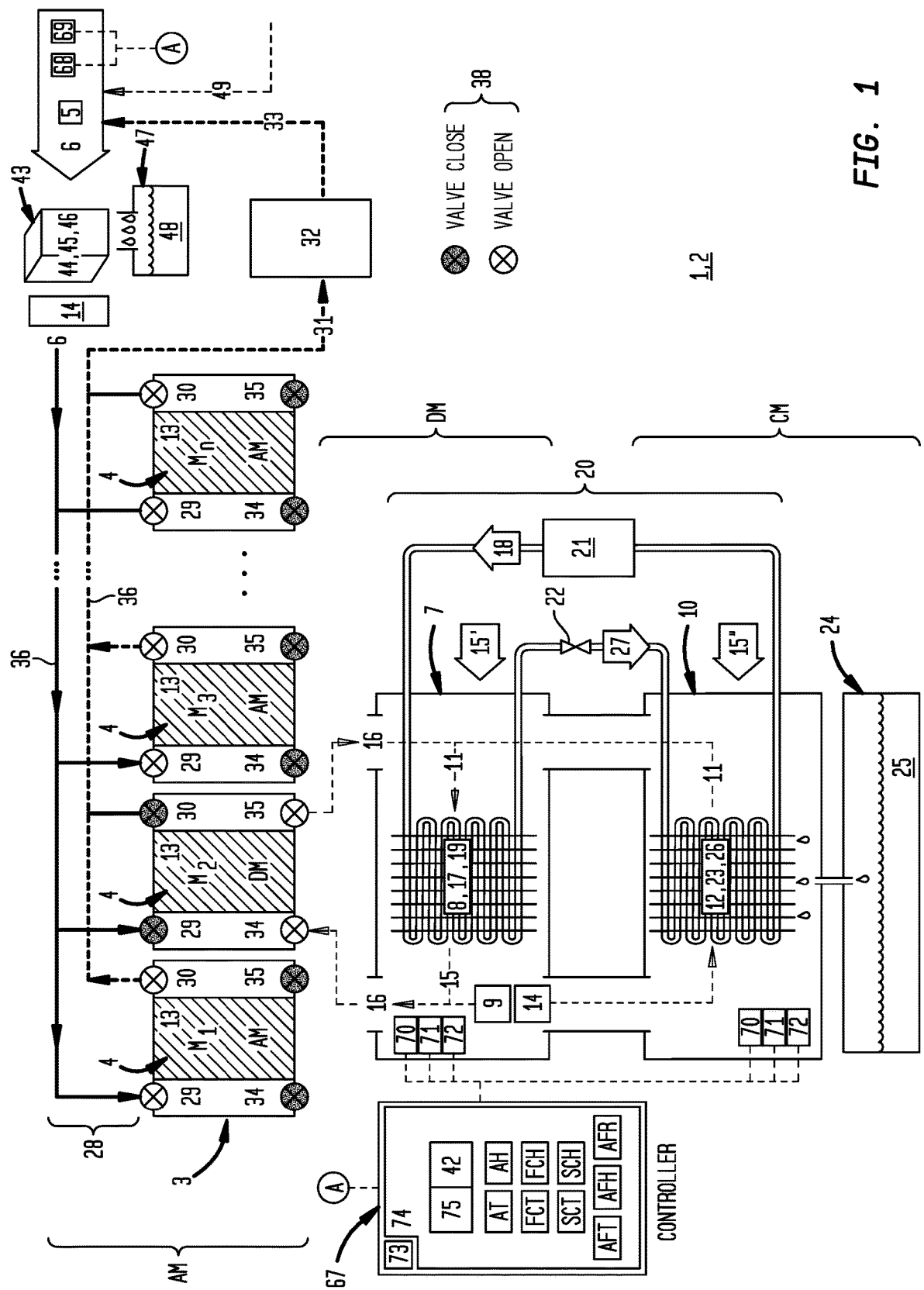
FIG. 1 is a block flow diagram of particular embodiment of an airflow dehumidification system.
Figure 2:
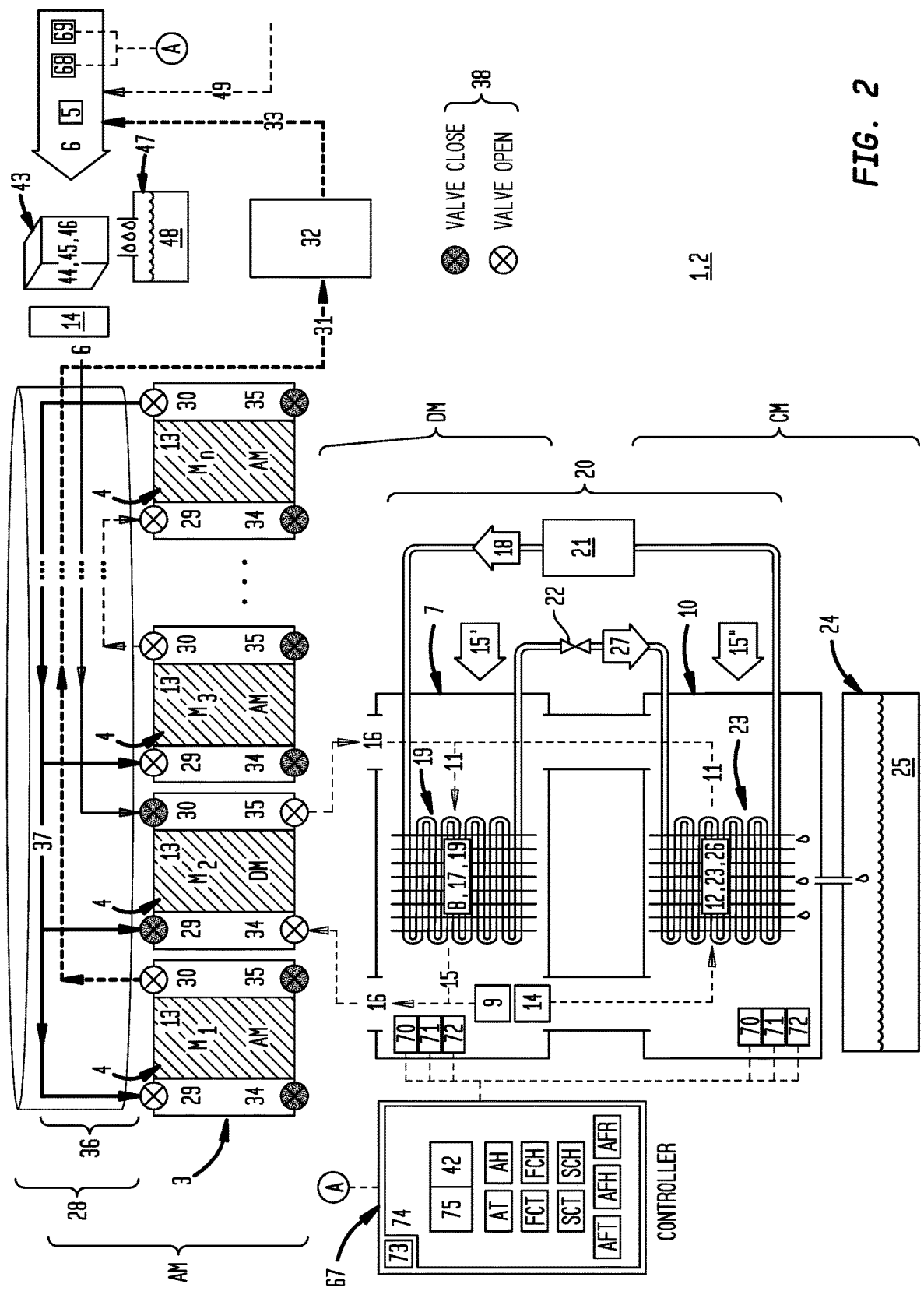
FIG. 2 is a block flow diagram of another particular embodiment of an air dehumidification system.

Now, with primary reference to FIGS. 1 and 2, the water capture material (4) comprises or consists of a composition that can adsorb water (5) from a supply airflow (6) in an adsorption mode (AM) of the system (1) or air dehumidifier (2) and which desorbs water vapor (9) in a desorption mode (DM) of the system (1) or air dehumidifier (2). Any suitable water capture material (4) can be used in embodiments of the system (1) or the air dehumidifier (2). The water capture material (4) can be the same, equivalent, or different between each of the plurality of modules (3). In particular embodiments, the water capture material (4) can be one or more metal-organic frameworks ("MOFs"). See for example: H. Furukawa et al., *Water Adsorption in Porous Metal-Organic Frameworks and Related Materials*, J. Am. Chem. Soc. 2014, 136, 11, 4369-4381. MOFs may be characterized by high water uptake and step-like characteristics for water uptake versus relative humidity ("RH"). In some variations, suitable water capture materials (4), including MOFs, can have such an isotherm step, which can be tailored to various climates. See for example: International Patent Publication No. WO2020112899, Multivariate and Other Metal-Organic Frameworks, and Uses Thereof. The step isotherm can enable water capture and release by MOFs in a very narrow range of relative humidity ("RH").

In particular embodiments, different variations or combinations of MOF can be utilized, including one or more of: MOF-303: Al(OH)(HPDC), where HPDC is 1H-pyrazole-3,5-dicarboxylate; CAU-10: Al(OH)(IPA), where IPA is isophthalate; MOF-801: $Zr_6O_4(OH)_4(fumarate)_6$; MOF-841: $Zr_6O_4(OH)_4(MTB)_6(HCOO)_4(H_2O)_2$; Aluminum Fumarate: Al(OH)(fumarate); MIL-160: Al(OH)(FDA), where FDA is 2,5-furandicarboxylate; MIL-53: Al(OH)(TPA), where TPA is terephthalate; or Aluminum Phosphate: AlPO4-LTA. In particular variations, the MOFs can have pore sizes in the range of about 0.5 nm to about 1 nm, or between about 0.7 nm to about 0.9 nm. In certain variations, the MOFs can have a hydrophilic pore structure. In certain variations, the MOFs can have a hydrophilic pore structure comprising acid and/or amine functional groups. In certain variations, the MOFs have one-dimensional channels that allow for reversible water adsorption. In some embodiments, the MOF can be mixed with a binder to improve its properties for adhesion to a substrate or support. Other suitable water capture material(s) (4) may include, as illustrative examples, certain molecular sieves (as one example, SAPO-34 a micropore zeolite, CAS No. 1318-02-1) and certain zeolites having the properties described above. Any combinations of the MOFs described herein, or other MOFs, or other compositions capable of water adsorption and water desorption may also be used alone or in various combinations.

In particular embodiments, the water capture material (4) can be disposed on one or more structural element(s) (13) located inside of one or a plurality of water capture modules (3). The structural element(s) (13) can be configured to increase the surface area of the water capture material (4) exposed to the supply airflow (6) to enhance water (5) adsorption from the supply airflow (6) during the adsorption mode (AM) of the system (1) or the air dehumidifier (2) or enhance heat transfer to the water capture material (4) during the desorption mode (DM) of the system (1) or air dehumidifier (2). In particular embodiments, the structural element(s) (13) can include plates or fins which can be independently coated on one or both sides with the water capture material (4). In some variations, the plates or fins can be arranged in spatial relationship, and in particular embodiments arranged substantially parallel to each other, with a gap existing between adjacent plates or fins. In particular embodiments, the gap between adjacent plates relative to the length of each plate can be adjusted to achieve contact with the supply airflow (6) to maximize water (5) adsorption by the water capture material (4) during the adsorption mode (AM) recirculated airflow (11) during the desorption mode (DM). In some variations, the gap between adjacent plates or fins can about one percent (1%) to about five (5%) of the length of a plate or fin. In particular embodiments, the plates or fins can be coated with layers of the water capture material (4) each having a thickness between about 10 microns to about 500 microns, or between about 50 microns to 500 microns, or between about 10 microns to about 50 microns. In particular embodiments, layers of water capture material (4) in these thickness ranges can allow for faster adsorption and/or desorption as compared to thicker layers of water capture material (4). In other embodiments, the plates or fins can be coated with layers of the water capture material (4) each having a thickness of about 0.1 centimeter ("cm") to about 1 cm. Thickness in this range may allow for production of larger quantities of water vapor (9) during the desorption mode (DM) as compared to thinner layers. In certain embodiments, each layer of the water capture material (4) on the plates or fins can have a porosity. In some variations, the calculated porosity (the volume of the pores in the water capture material divided by the total volume of the water capture material×100) can be at least about 40%, at least about 50%, at least about 60%, at least about 70%, or at least about 80%; or about 40% to about 90%, about 50% to about 90%, about 40% to about 80%, about 50% to about 80%, or about 60% to about 80%. In other embodiments, the layer of the water capture material (4) can be substantially non-porous. In particular embodiments, the thickness of the layer of the water capture material (4) can be greater than the thickness of a plate for fin. In certain embodiments, only one side of the plate of fin may be coated with water capture material (4) with the thickness of the water capture material relative to the thickness of the plate of fin adapted to reduce or minimize the amount of energy used per unit of water released from the water capture material (4) during the desorption mode (DM) of the system (1) or air dehumidifier (2). Similarly, in certain embodiments, both sides of the plate or fin can be coated with the water capture material (4) and the ratio of the thickness of the first layer (e.g., first side layer) of the water capture material (4) to the thickness of the plate or fin to the thickness of the second layer (e.g., second side layer) of the water capture material (4) can be adapted to reduce or minimize the amount of energy used per unit of water released from the water capture material (4) during the desorption mode (DM) of the system (1) or air dehumidifier (2). The plates or fins may be made of any suitable material, including any suitable metal or plastic. As an illustrative example, the plates can comprise one or more of aluminum, copper, iron, nickel, tungsten. In some variations, the plates comprise a solid metal. In other variations, each plate or fin can have a cellular design defining small channels or corrugates. In other variations, each plate or fin can further include topographic features that enhance water adsorption. Illustrative examples of topographical features include one or more of: granulation, perforations, arc holes, bumps, ridges, or grooves, or any combination thereof. In another variation, the plates or fins can comprise a mesh.

Again, with primary reference to FIGS. 1 and 2, in the adsorption mode (AM) of the system (1) or air dehumidifier (2), the water capture material (4) absorbs water (5) from a supply airflow (6) passing through one or more of the plurality of modules (3). In particular embodiments, an air circulator (14) can operate to move the supply airflow (6) over the water capture material (4) contained in one or more of the plurality of modules (3) to assist adsorption of water (5) by the water capture material (4). In particular embodiments, the air circulator (14) can move the supply airflow (6) at determined velocity through the water capture material (4). As an illustrative example, the water capture material (4) can be coated on adjacent structural elements (13), and the supply airflow (6) can pass through gaps between the structural elements (13) during the adsorption mode (AM). The adsorption mode (AM) as to one or more of the plurality of modules (4) can conclude when the water capture material (4) reaches a target level of water saturation or a target rate of water adsorption. In particular embodiments, the adsorption mode (AM) as to one or more of the plurality of modules (4) can conclude which the supply airflow (6) discharged from one or more of the plurality of modules (4) reaches or exceeds a target level of relative humidity (RH) or a target level dew point (DP). In other embodiments, the adsorption mode (AM) as to one or more of the plurality of modules (3) can conclude based on elapse of a period time.

For example, as to one or more of the plurality of modules (3) the system (1) or air dehumidifier (2) can switch from the adsorption mode (AM) to the desorption mode (DM) after elapse of a pre-determined period of time. Understandably, various combinations of these events can be utilized to conclude the adsorption mode (AM) of one or more of the plurality of modules (3).

Now, with primary reference to FIGS. 1 and 2, the first chamber (7) can be thermally coupled to a heating source (8). The term "thermally coupled" broadly encompasses any mode of heat transfer to the first chamber (7) and can include one or more of conduction, convection, or radiation to heat the inside of the first chamber (7). The heating source (8) can comprise any mechanism, object, area, material, composition, byproduct, waste energy, or energy, and combinations thereof, which can transfer heat to or into the first chamber (7). In the illustrative example of FIGS. 1 and 2, the heating source (8) resides inside of the first chamber (7), however, the heating source (8) can be disposed outside of the first chamber (7) and adapted to or configured to directly heat the structure of first chamber (7) or the heating source (8) disposed outside of the first chamber (7) can be adapted to or configured to direct heated air (15') into the first chamber (7).

In the desorption mode (DM), the first chamber (7) can be fluidically coupled by an airflow path (16) to one or more of said plurality of modules (3) during the desorption mode (DM). The recirculated airflow (11) heated in the first chamber (7) recirculates in the airflow path (16) to heat the water capture material (4) contained in one or more of said plurality of modules (3) fluidically coupled to the first chamber (7) to desorb water vapor (9) from the water capture material (4). Typically, the heating source (8) operates to heat the recirculated airflow (11) between the first chamber (7) and the one or more of the plurality of modules (3) in the desorption mode (DM) to one or more temperatures in the range of about 80° C. (about 176° F.) to about 160° C. (about 320° F.). Specific temperatures within the temperature range can be dependent upon the water capture material(s) (4), or combinations of water capture materials (4), contained in the one or more of the plurality of modules (3) in the desorption mode (DM). However, this is not intended to preclude embodiments which exploit temperatures outside the range to release water vapor (9) from the water capture material (4).

Again, with primary reference to the illustrative examples of FIGS. 1 and 2, the heating source (8) can comprise a first heat exchanger (17) through which heated fluid (18) circulates. The first heat exchanger (17) can be disposed in the first chamber (7). The first heat exchanger (17) can be configured to transfer heat from the heated fluid (18) to the recirculated airflow (11) between the first chamber (7) and the one or more of the plurality of modules (3) in the desorption mode (DM). In particular embodiments, the heating source (8) can comprise a condenser (19) of a heat pump (20). A heat pump (20) can include one or more of: a compressor (21), an expansion valve (22), a condenser (19) (or hot-side heat exchanger), and an evaporator (23) (or cold-side heat exchanger). The compressor (21) can operate to compress a refrigerant resulting in a heated fluid (18) which can be circulated to the condenser (19). The condenser (19) can transfer heat to the first chamber (7) sufficient to release water vapor (9) from the water capture material (4) contained in one or more of the plurality of modules (3) in the desorption mode (DM) of the system (1) or the air dehumidifier (2). The condenser (19) (or hot side of the heat exchanger) can be set to operate at one or more temperatures in the range of about 90° C. (about 194° F.) to about 160° C. (about 320° F.). In particular embodiments, the water vapor (9) desorbed from the water capture material (4) of the one or more plurality of modules (3) in the desorption mode (DM) can be released to the atmosphere.

Again, with primary reference to FIGS. 1 and 2, embodiments of the system (1) or air dehumidifier (2) can include a second chamber (10) fluidically coupled to the first chamber (7). The water vapor (9) released from the water capture material (4) during the desorption mode (DM) can be carried in the recirculated airflow (11) in the flow path (16) from the first chamber (7) to the second chamber (10) during the condensation mode (CM) of the system (1) or air dehumidifier (2). In particular variations, the desorption mode (DM) can operate independent of the condensation mode (CM) until reaching a target water vapor (9) concentration in the first chamber (7). The air circulator (14) can then operate to generate a recirculated airflow (11) between the first chamber (7) and the second chamber (10) of the system (1) or air dehumidifier (2). Recirculated airflow (11) between the first chamber (7) and the second chamber (10) can initiate the condensation mode (CM) of the system (1) or air dehumidifier (2). In particular embodiments, the adsorption mode (AM) as to one or more of the plurality of modules (3), the desorption mode as one or more of the plurality of modules (3), and the condensation mode (CM) can operate as independent events, or in particular embodiments, the adsorption mode (AM) as to one or more of the plurality of modules (3), the desorption mode as one or more of the plurality of modules (3), and the condensation mode (CM) can operate concurrently, or combinations of independent and concurrent events depending on the application.

Again, with primary reference to FIGS. 1 and 2, a cooling source (12) can be thermally coupled to the second chamber (10). The cooling source (10) can operate to cool the water vapor (5) carried in the recirculated airflow (11) between said first chamber (7) and the second chamber (10) during the condensation mode (CM) of the system (1) or air dehumidifier (2). The cooling source (12) can sufficiently cool the water vapor (9) in or passing through the second chamber (10) to cause condensation of at least a portion of the water vapor (9) carried by the recirculated airflow (11) into liquid water (25). In particular embodiments, the cooling source (12) can be disposed to cool the structure of the second chamber (10) to a temperature lower than the dewpoint of the recirculated airflow (11) within the second chamber (10) to cause condensation of at least a portion of the water vapor (5) carried by the recirculated airflow (11) into liquid water (25). The second chamber (10) can be configured to increase the surface area of the internal surfaces of the second chamber (10) to increase condensation of water vapor (9) in the recirculated airflow (11) within the second chamber (10). In other embodiments, the cooling source (12) can be disposed inside of the second chamber (10) and the recirculated airflow (11) carrying water vapor (9) can pass over the cooling source (12) to cause condensation of at least a portion of the water vapor (9) within the second chamber (10). In particular embodiments, the cooling source (12) can comprise cooled air (15") produced by a machine or other process discrete from the system (1) or the air dehumidifier (2) directed proximate to or into the second chamber (10). An illustrative example, waste cold can comprise the re-gasification of liquid natural gas from the frozen state. In other embodiments, the cooling source (12) can comprise a second heat exchanger (26) through which a cooled fluid (27) circulates. The second heat exchanger (26) can be disposed proximate to or inside the second chamber (10) to cool the recirculated airflow (11) carrying the water vapor (9) contained in or passing through the second chamber (10). The recirculated airflow (11) can be cooled to below the dewpoint to cause condensation of at least a portion of the water vapor (9) into liquid water (25). The liquid water can be collected in a water collection reservoir (24).

Again, with primary reference to the illustrative example of FIGS. 1 and 2, in particular embodiments, the cooling source (12) can be an evaporator (23) of a heat pump (20). An expansion valve (22) can be configured to receive the heated fluid (18) from the condenser (19). The expansion valve (22) can operate to allow expansion of the heated fluid (18) to produce a cooled fluid (27). The cooled fluid (27) can circulate to the evaporator (23). The evaporator (23) or cold-side heat exchanger can be set to operate at temperatures in the range of about 30° C. (about 86° F.) to about 95° C. (about 203° F.). The evaporator (23) can be associated with the second chamber (10) to transfer heat, whether directly or indirectly, from the recirculated airflow (11) carrying water vapor (9) contained in or passing through the second chamber (10). As illustrative examples, the evaporator (23) can be disposed to transfer heat from one or more of: the structure of the second chamber (10), from structural elements (13) within the second chamber (10), from the recirculated airflow (11) within the second chamber (10), or otherwise disposed to cause a decrease in temperature of the recirculated airflow (11) sufficient to cause condensation of at least a portion of the water vapor (9) carried by the recirculated airflow (11) in the condensation mode (CM) of the system (1) or dehumidifier (2).

Now, with primary reference to FIGS. 1, 2 and 3A through 3C, embodiments of the system (1) or the air dehumidifier (2) can include a reconfigurable airflow path (28) interconnecting the plurality of modules (3). The reconfigurable airflow path (28) allows one or more of the plurality of modules (3) to be fluidically coupled to the first chamber (7) during the desorption mode (DM) of the air dehumidification system (1) or air dehumidifier (2) while the remaining other ones of the plurality of modules (3) remain fluidically coupled, connected or interconnected to the supply airflow (6) to independently or concurrently operate in the adsorption mode (AM) of the air dehumidification system (1) or air dehumidifier (2).

Again, with primary reference to FIGS. 1, 2 and 3A through 3C, in particular embodiments, each of the plurality of modules (3) can be fluidically coupled to an adsorption airflow inlet (29) and an adsorption airflow outlet (30), wherein the adsorption airflow inlet (29) and the adsorption airflow outlet (30) remain open to allow the supply airflow (6) to pass through one or more of the plurality of modules (3) during the adsorption mode (AM). In particular embodiments, the plurality of modules (3) in the adsorption mode (AM) can be coupled by the reconfigurable airflow path (28) to concurrently in parallel receive the supply airflow (6) (as shown in the illustrative example of FIG. 3A). In particular embodiments, the plurality of modules (3) in the adsorption mode (AM) can be coupled by the reconfigurable airflow path (28) to concurrently in series receive the supply airflow (6) (as shown in the illustrative example of FIG. 3B). During operation of the plurality of modules (3) fluidically coupled in series, the reconfigurable airflow path (28) can be configured to circulate the supply airflow (6) through the plurality modules (3) in serial order from a first of plurality of modules (3) containing water capture material (4) having greatest water saturation (shown in the example of FIG. 3B as module (M4) and in the example of FIG. 3C as module (M5)) to a last of plurality of modules (3) containing water capture material (4) having least water saturation (shown in the example of FIG. 3B as module (M2) and in the example of FIG. 3C as module (M3)). The discharge airflow (31) egressing from the last of the plurality of modules (3) can be directed to an indoor space (32), or mixed with indoor recirculated air (33), to maintain indoor recirculated air (33) at or below a pre-determined relative humidity (RH) or dew point (DP).

Again, with primary reference to FIGS. 1, 2 and 3A through 3C, in particular embodiments, each of the plurality of modules (3) can be fluidically coupled to a desorption airflow inlet (34) and a desorption airflow outlet (35). During operation of the one or more of plurality of modules (3) in the absorption mode (DM), the adsorption airflow inlet (29) and the adsorption airflow outlet (30) remain open, and the desorption airflow inlet (34) and the desorption airflow outlet (35) remain closed.

Now, with primary reference to the illustrative example of FIG. 1, the reconfigurable airflow path (28) disposes one of the plurality of modules (3) (M2) in the desorption mode (DM) in which the adsorption airflow inlet (29) and said adsorption airflow outlet (30) remain closed and the desorption airflow inlet (34) and the desorption airflow outlet (35) remain open to fluidically couple one of the plurality of modules (3) (M2) to the first chamber (7). The reconfigurable airflow path (28) fluidically couples the other of plurality of modules (3) (M1 and M3 . . . Mn) to receive the supply airflow (6) in parallel to concurrently operate in the adsorption mode (AM) while one of the plurality of modules (3) (M2) operates in the desorption mode (DM).

Now, with primary reference to the illustrative example of FIG. 2, the reconfigurable airflow path (28) disposes one of the plurality of modules (3) (M2) in the desorption mode (DM) in which the adsorption airflow inlet (29) and said adsorption airflow outlet (30) remain closed and the desorption airflow inlet (34) and the desorption airflow outlet (25) remain open to fluidically couple one of the plurality of modules (3) (M2) to the first chamber (7). The reconfigurable airflow path (28) fluidically couples the other of the plurality of modules (3) (M1 and M3 . . . Mn) to receive the supply airflow (6) in serial order to concurrently operate in the adsorption mode (AM) while one of the plurality of modules (3) (M2) operates in the desorption mode (DM). In this illustrative example, the plurality of modules (3) in the adsorption mode (AM) can be fluidically coupled in series to circulate the supply airflow (6) in serial order from a first of plurality of modules (M3) containing water capture material (4) having greatest water saturation to a last of said plurality of modules (M1) containing water capture material (4) having least water saturation. In this illustrative example, the one of the plurality of modules (3) (M2) in the desorption mode (DM) can comprise the one of the plurality of modules (3) (M2) that contains water capture material (4) having greatest water saturation not in the adsorption mode (AM).

Again, with primary reference to the illustrative example of FIG. 2, the reconfigurable airflow path (28) can be defined by a plurality of conduits (36) fluidically interconnecting each adsorption airflow inlet (29) and each adsorption airflow outlet (30) of each of the plurality of modules (3) in the adsorption mode (AM) to an air distribution valve (37). In one configuration of the air distribution valve (37) the adsorption airflow inlet (29) and the adsorption airflow outlet (30) of one of the plurality of modules (3) (M2) remain closed and the desorption airflow inlet (34) and the desorption airflow outlet (35) remain open to fluidically couple that one of the plurality of modules (3) (M2) to the first chamber (7) to initiate the desorption mode (DM). The remaining plurality of modules (3) (M1, M3 . . . Mn) maintain the adsorption airflow inlet (29) and the adsorption airflow outlet (30) open and the desorption airflow inlet (34) and the desorption airflow outlet (34) closed in the adsorption mode (AM). In particular embodiments, the remaining plurality of modules (3) in the adsorption mode (AM) can receive the supply airflow (6) in serial order from a first of plurality of modules (3) (M3) containing water capture material having greatest water saturation to a last of plurality of modules (3) (M1) containing water capture material (4) having least water saturation. In particular embodiments, a first portion of the reconfigurable airflow path (28) can be disposed in the distribution valve (37) and a second portion of the reconfigurable airflow path (28) can be fluidically coupled to the adsorption airflow inlets (29) and the adsorption airflow outlets (30) of each of the plurality of modules (3) can have a fixed spatial configuration. Operation of the air distribution valve (37) defines the serial order which one of the plurality of modules (3) operates in the desorption mode (DM) and which of the remaining plurality of modules (3) operate in the adsorption mode (AM), and in particular embodiments, which of the remaining plurality of modules (3) occurs first in the serial order and last in the serial order to receive the supply airflow (6) through the plurality of modules (3) in the adsorption mode (AM).

Now, with primary reference to FIG. 3A through FIG. 3C, in particular embodiments of the system (1) or the air dehumidifier (2), the plurality of modules (3) can be fluidically coupled, connected or interconnected by a plurality of conduits (36) and valves (38) (also identified as one of V1 . . . Vn) (also referred to as a "valved conduit") (VC). In the illustrative examples, each of the plurality of modules (3) can be fluidically coupled to a valved adsorption airflow inlet (29) (V1) and a valved adsorption airflow outlet (30) (V2). The valved adsorption airflow inlet (V1) and a valved adsorption airflow outlet (V2) remain in open in the adsorption mode (AM) of the plurality of modules (3). In particular variations, in which the system (1) or the air dehumidifier (2) includes a desorption mode (DM), or further includes the condensation mode (CM), each of the plurality of modules (3) can be fluidically coupled to a valved desorption airflow inlet (34) (V3) and a valved desorption airflow outlet (35) (V4), wherein the valved desorption airflow inlet (34) (V3) and the valved desorption airflow outlet (35) (V4) remain open, and wherein the valved adsorption airflow inlet (29) (V1) and said valved adsorption airflow outlet (30) (V2) remain closed during the desorption mode (DM). The valved conduit (VC) can further provide a valved supply conduit (VSC) having a valved supply branch (39) (V5) to each valved adsorption airflow inlet (29) (V1). The valved conduit (VC) can further provide a valved discharge conduit (VDC) having a valved discharge branch (40) (V6) from each valved adsorption airflow outlet (35) (V2). The valved conduit (VC) can further include a valved lateral conduit (41) (V7) interconnecting a valved discharge branch (40) (V6) of a first of a plurality of modules (3) to a valved supply branch (39) (V5) of a second of a plurality of modules (3). This illustrative configuration of the valved conduit (VC) allows a discrete pre-selectable operating specification (42) to be established for one or more of the plurality of modules (3) in the adsorption mode (AM) and established for one or more of the plurality of modules (3) in the desorption mode (DM).

Now, with primary reference to the illustrative example of FIG. 3A, the pre-selected operating specification (42) can be implemented to concurrently allocate the supply airflow (6) in parallel to each of the valved supply branches (39) (V5) and concurrently allocate the discharge airflow (31) in parallel to each of the valved discharge branches (40) (V6) with the desorption airflow inlet (34) and the desorption airflow outlet (35) remaining in the closed condition to allow the plurality of modules (3) in the adsorption mode (AM) (M1, M2, M4 through Mn) to operate concurrently in a parallel adsorption mode (AM) while one of the plurality of modules (3) (M3) operates in the desorption mode (DM). In that event, each valved adsorption airflow inlet (29) (V1) and each valved adsorption airflow outlet (30) (V2) and each valved supply branch (39) (V5) and the valved discharge branch (40) (V6) of the plurality of modules (3) (M1, M2, M4 through Mn) in the adsorption mode (AM) can be open while the valved desorption airflow inlet (34) (V3) and a valved desorption airflow outlet (35) (V4) remain in the closed condition.

Now, with primary reference to the illustrative example of FIG. 3B, the pre-selected operating specification (42) can be implemented to allocate the supply airflow (6) through an ordered series of the plurality of modules (3) in the adsorption mode (AM) while one of the plurality of modules (3) operates in the desorption mode (DM). In that event, the valved adsorption airflow inlet (29) (V1) and the valved adsorption airflow outlet (30) (V2) and each valved lateral conduit (41) (V7) interconnecting a valved discharge branch (40) (V6) to a valved supply branch (39) (V5) of the plurality of modules (3) in the adsorption mode (AM) are open. The valved supply branch (39) (V5) to a first of the plurality of modules (3) (M4) in a series and the valved discharge branch (40) (V6) of the last of the plurality of modules (3) (M2) in the series are open condition with each valved lateral conduit (41) (V7) interconnecting a valved discharge branch (40) (V6) to a valved supply branch (39) (V5). In the illustrative example of FIG. 3B, the first of the plurality of modules (3) (M4) in the series contains water capture material (4) having greatest water saturation (98%) to a last of said plurality of modules (3) (M2) containing water capture material (4) having the least water saturation (near 0%).

Now, with primary reference to the illustrative example of FIG. 3C, the pre-selected operating specification (42) can be implemented to reconfigure the reconfigurable airflow path (28) to dispose a different one of the plurality of modules (3) (M4) in the desorption mode (DM) in which the valved adsorption airflow inlet (29) (V1) and the valved adsorption airflow outlet (30) (V2) remain closed and the valved desorption airflow inlet (34) (V4) and the desorption airflow outlet (35) (V5) remain open to fluidically couple one of the plurality of modules (3) (M4) to the first chamber (7) to allow regeneration of the water capture material (4), while concurrently disposing the prior desorbed one of the plurality of modules (3) (M3) into the adsorption mode (AM) in which the valved adsorption airflow inlet (29) (V1) and the adsorption airflow outlet (30) (V2) remain open and the valved desorption airflow inlet (34) (V4) and the desorption airflow outlet (35) (V5) remain closed to fluidically decouple the prior desorbed one of the plurality of modules (3) (M3) from the first chamber (7).

Again, with primary reference to FIGS. 1, 2 and 3A through 3C, embodiments of the dehumidification system (1) or air dehumidify (2) having the plurality of modules (3) operating in parallel or in series in the adsorption mode (AM) can at a given temperature substantially reduce the discharge airflow (31) relative humidity (RH) (or absolute humidity (AH)) and the discharge airflow dew point (DP). The illustrative examples of the dehumidification system (1)

or air dehumidifier (2) can, at temperature of about 20° C. (about 68° F.) afford a discharge airflow (31) having a relative humidity (RH) in a range of 0.1% relative humidity to about 20% relative humidity. Depending on the application, at a discharge airflow temperature of 20° C. (about 68° F.) the discharge airflow humidity can be selected from the group comprised of or consisting of: about 0.2% to about 1%, about 0.5% to about 2%, about 1% to about 3%, about 2% to about 4%, about 3% to about 5%, about 4% to about 6%, about 5% to about 7%, about 6% to about 8%, about 7% to about 9%, about 8% to about 10%, about 9% to about 11%, about 10% to about 12%, about 11% to about 13%, about 12% to about 14%, about 13% to about 15%, about 14% to about 16%, about 15% to about 17%, about 16% to about 18%, about 17% to about 19%, and combinations thereof. In particular embodiments, the discharge airflow (31) at a temperature of 20° C. (about 68° F.) can be less than 0.2% (RH).

Similarly, the illustrative examples can afford a discharge airflow (31) having temperature of about 20° C. (about 68° F.) with a dew point (DP) between about −30° C. (about −22° F.) to −70° C. (about −94° F.). Depending on the application, the discharge airflow dew point can be selected from the group comprised of or consisting of: about −30° C. to about −40° C., about −35° C. to about −45° C., about −30° C. to about −50° C., about −45° C. to about −55° C., about −50° C. to about −60° C., about −55° C. to about −65° C., about −60° C. to about −70° C., and less than −70° C. In particular embodiments, the discharge airflow dew point can be less than −70° C. (less than −94° F.).

Now, with primary reference to FIGS. 1 and 2, particular embodiments can further include a pre-cooler (43) to condition the supply airflow (6) directed to the plurality of modules (3). In particular embodiments, the pre-cooler (43) can include a pre-cooler compressor (44); a pre-cooler condenser (45); a pre-cooler evaporator (46); and an auxiliary condensate reservoir (47) to collect condensed water (47) discharged from the pre-cooler evaporator (46). Thus, the supply airflow (6), which in particular embodiments can comprise make-up outdoor air (49) or indoor recirculated air (33) or a mixture thereof, having relatively high dew point (DP), can be pre-cooled to condense a portion of the water (5) carried in the supply airflow (6). The condensed water (48) can be collected in an auxiliary condensate reservoir (47). As an illustrative example, a precooler (43) suitable for use with particular embodiments of the invention can be a Magnitude® Magnetic-bearing Centrifugal Chiller, Model WME, WMC available through Daikin Applied Americas Inc., 13600 Industrial Park Boulevard, Minneapolis, MN 55441. However, this example of a pre-cooler (43) is not intended to preclude the use of other devices to pre-cool the supply airflow (6).

There can be a substantial advantage in pre-cooling the supply airflow (6) with a pre-cooler (43) prior to delivering the supply air (6) to the plurality of modules (3). As an illustrative example, outdoor make-up air (49) at 25° C. (about 77° F.) and 70% RH (moisture concentration of about 21 grams per cubic meter) can enter the pre-cooler (43) to cool the supply airflow to about 5° C. (about 41° F.) and 100% RH. The cooled supply airflow (6) can be delivered to the plurality of modules (3) in the adsorption mode (AM) in an ordered series. The plurality of modules (3) in the adsorption mode (AM) can contain a water capture material (4) selected to have an adsorption limit of 18% RH at 5° C. (about 41° F.). The discharge airflow (31) from the plurality modules (3) in the adsorption mode (AM) can be at about 18% RH at about 5° C. (about 41° F.) which corresponds to a dew point of −18° C. (about 0.5° F.) (about 1.2 grams of water per cubic meter of discharge airflow (31)).

By comparison, in the same illustrative example without a pre-cooler (43), the outdoor make-up air (49) at 25° C. (about 77° F.) and 70% RH (moisture concentration of about 21 grams per cubic meter) can be delivered as a supply airflow (6) to the plurality of modules (3) in the adsorption mode (AM) in an ordered series. The plurality of modules (3) in the adsorption mode (AM) can contain a water capture material (4) selected to have an adsorption limit of 18% RH at 25° C. (about 41° F.). The discharge airflow (31) from the plurality modules (3) in the adsorption mode (AM) can be at about 18% RH at about 25° C. (about 41° F.) which corresponds to a dew point of −1° C. (about 30° F.) (about 4.5 grams of water per cubic meter of discharge airflow (31)). Now, with primary reference to FIG. 4, in particular embodiments, the supply air (6) can be passed through a first plurality of modules (3') containing a water capture material (4') having a first hydrophobicity level (50) resulting in first discharge airflow (31') having a lower dew point (DP) than the supply air (6). The first discharge airflow (31') can then be passed through a second plurality of modules (3") containing a water capture material (4") having second hydrophobicity level (51), wherein the water capture material (4') contained in the first plurality of modules (3') less hydrophobic than the water capture material (4") contained in the second plurality of modules (3"), resulting in a second discharge airflow (31") with a dew point (DP) less than the first discharge airflow (31'). Each of the first and second plurality of modules (3', 3") (or additional plurality of modules) can have one or more of the plurality modules (3', 3") disposed in the desorption mode (DM) as above described. The process can be repeated with one or more additional plurality of modules (3'" . . . 3$_n$) containing water capture material (4'" . . . 4$^n$) of successively higher hydrophobicity until the discharge air has the desired dew point (DP). In particular embodiments, the supply air (6) to each of the first plurality of modules (3') or second plurality of modules (3") (or additional plurality of modules) can prior pass through one or more pre-coolers (43', 43").

Again, with primary reference to FIG. 4, embodiments of an air dehumidification system (1) can include a first pre-cooler (43') through which make-up outdoor air (49) can pass to reduce the dew point (DP) of the make-up outdoor air (49) (DP>5° C.). The make-up outdoor air (49) discharged from the first pre-cooler (43') can be fluidically coupled to a first plurality of modules (3'), or a successively through a first and second or more plurality of modules (3" . . . 3n) containing water capture material (4) of successively higher hydrophobicity during the adsorption mode (AM) resulting in a discharge airflow (31', 31") having a desired dew point (DP) (e.g. DP<−30° C.). The first and second or more plurality of modules (3" . . . 3n) can be regenerated in the desorption mode (DM) (as shown the examples of FIGS. 1 and 2). The discharge airflow (31', 31") (DP<−30° C.) from the one or more plurality of modules (3', 3" . . . 3n) can be mixed with indoor recirculated air (33) having a similar dew point (e.g. DP<−30° C.) and the mixture of the discharge airflow (31' or 31', 31") and indoor recirculated air (33) can be passed through a second pre-cooler (43") to reduce the dew point (DP) of the discharge airflow (31' or 31', 3") mixed with recirculated indoor air (33) (e.g. DP<−30° C.). The discharge airflow (31' or 31', 3") mixed with recirculated indoor air (33) discharged as pre-cooled airflow (60) from the second pre-cooler (43") can pass through one or more desiccants (52), such as: silica gel or zeolites, which can be incorporated into a desiccant wheel (53). The desiccant discharge airflow (55) from the one or more desiccants (52) can have a substantially lower DP (e.g. DP<−70° C.). The one or more desiccants (52) can be regenerated by passing regeneration air (54) (which can include a portion of the desiccant air (55)) through a regeneration heater (56) to generate heated air of sufficient temperature and volume to regenerate the desiccant(s) (52), or the desiccant wheel (53). Desiccant air (55) can pass through a process air pre-heater (57) to provide an indoor recirculated air (33) of a desired temperature and volume that can be discharged into an indoor space (33). This illustrative embodiment of the air dehumidification system (1) can be useful in producing indoor recirculated air (33) suitable for use in indoor spaces (32) such as dry rooms. The indoor recirculated air (33) resulting from embodiments of the air dehumidification system (1) can be suitable for discharge into an indoor space (32) used in semiconductor or lithium battery production. Semiconductor and lithium battery production require RH<1% or DP−20.0° C. and below. Dewpoint (DP) requirements within dry rooms currently range from −35.0° C. to as low as −60.0° C. measured in the indoor recirculated air (33) as an average across the indoor space (32). At critical areas DP required can be as low as −70.0° C. which can be obtained using embodiments of the system (1).

Now, with primary reference to the illustrative example of FIG. 5, embodiments of an air dehumidification system (1) can include an airflow heat exchanger (58) through which a hot supply airflow (6') (e.g. DP>40° C.) can pass to reduce the dew point (DP) of the hot supply air (6') prior to being delivered to a plurality of modules (3) in the adsorption mode (AM). For the purposes of this invention, the term airflow heat exchanger (58) means any device adapted to or configured to bring a hot supply air (6) into thermal contact with colder ambient air (6"). As illustrative examples, the term airflow heat exchanger (58) encompasses air to air heat exchangers, parallel heat exchangers, counter flow heat exchangers, cross flow heat exchangers, and combinations thereof. The airflow heat exchanger discharge air (59) can be fluidically coupled to a plurality of modules (3) or a successively through a first and second or more plurality of modules (3', 3" . . . 3n) containing water capture material (4', 4") of successively higher hydrophobicity during the adsorption mode (AM) resulting in a discharge airflow (31', 31") having a desired dew point (DP) (e.g. DP<−30° C.). The first and second or more plurality of modules (3', 3" . . . 3n) can be regenerated in the desorption mode (DM) (as shown in the examples of FIGS. 1 and 2). The discharge airflow (31', 31") (DP<−30° C.) from the first and second or more plurality of modules (3', 3" . . . 3n) can be passed through a pre-cooler (43") to reduce the dew point (DP) of the discharge airflow (31', 31") (e.g. DP<−30° C.). The pre-cooled airflow (60) discharged from the pre-cooler (43") can pass through one or more desiccants (52), such as: silica gel or zeolites, which can be incorporated into a desiccant wheel (53). The desiccated air (55) discharged from the one or more desiccants (52) can have a substantially lower DP (e.g. DP<−70° C.). The one or more desiccants (52) can be regenerated by passing regeneration air (54) (which can include a portion of the desiccated air (55) through a regeneration heater (56) to generate heated air of sufficient temperature and volume to regenerate the desiccant (52) or regenerate the desiccant wheel (53). Desiccant air (55) (e.g. DP<−70° C.) can pass through a one or more carbon capture modules (61) (or carbon capture system) containing carbon capture material(s) (62) to provide a decarbonized airflow (63). In particular embodiments, the carbon capture material(s) (62) can selectively capture carbon dioxide (64) from the desiccant air (55). In some variations, the carbon capture material (62) can be an MOF in which the organic ligands have amine functional groups, including primary amines, that can bind carbon dioxide (64) molecules via chemisorption even in presence of water (5) molecules. Any suitable MOFs capable of adsorbing and desorbing carbon dioxide (64) may be employed in the air dehumidification systems (1) described herein. Suitable MOFs may include those described in, for example, M. Ding, et al., Chem. Soc. Rev., 2019, 48, 2783-2828; A. M. Fracaroli, et al, J. Am. Chem. Soc., 2014, 136, 8863-8866; H. Li, et al., ChemSusChem., 2016, 9, 2832-2840. In some variations, the carbon capture material (62) can comprise one or more of: IRMOF-74-III—$CH_2NH_2$:{$Mg_2$(2'-(aminomethyl)-3,3"-dioxido-[1,1':4',1"-terphenyl]-4,4"-dicarboxylate)}; IRMOF-74-III—$(CH_2NH_2)_2$:{Mg2(2',5'-bis(aminomethyl)-3,3"-dioxido-[1,1':4',1"-terphenyl]-4,4"-icarboxylate)}; mmen-Mg2 (dobpdc): $Mg_2$(dobpdc)(mmen)$1.6(H_2O)_{0.4}$, where dobpdc is 4,4'-dioxido-3,3'-biphenyldicarboxylate and mmen is N,N'-dimethylethylenediamine; $Mg_2$(dobdc)$(N_2H_4)_{1.8}$: $Mg_2$(dobpdc)$(N_2H_4)_{1.8}$, where dobpdc is 4,4'-dioxido-3,3'-biphenyldicarboxylate; Cr-MIW-101-$SO_3$H-TAEA: $Cr_3$O(OH)(BDC-$SO_3$)$(H_2O)_2$(TAEA), where BDC-$SO_3$ is 2-sulfoterephthalate and TAEA is Tris(2-aminoethyl)amine; or Cr-MIL-101-PEI-800: $Cr_3$O(OH)(BDC)(PEI-800), where PEI-800 is polyethylenimine, branched. Any combinations of the carbon capture materials (62) described herein or equivalents may also be used. This illustrative embodiment of the air dehumidification system (1) can be useful in processing flue gases (65).

Now, with primary reference to the illustrative example of FIG. 6, a similar embodiment of the illustrative example of FIG. 5 can be utilized to process a supply airflow (6) exclusive of the airflow heat exchanger (57) to provide a decarbonized airflow (63).

Now, with primary reference to the illustrative example of FIG. 7, a similar embodiment of the illustrative example of FIG. 6, exclusive of the carbon capture modules (61), can be used to process a supply airflow (6) to provide a discharge airflow (31) for the production of compressed gases (66).

Now, with primary reference to FIGS. 1 and 2, in particular embodiments, the air dehumidification system (1) or the air dehumidifier (2) can further include a controller (67) coupled to one or more ambient atmosphere temperature sensors (68) and/or one or more ambient atmosphere humidity sensors (69) located outside of the first chamber (7) and the second chamber (10) adapted to or configured to generate a signal that varies with change in ambient atmosphere temperature (AT) and/or ambient atmosphere humidity (AH) of the environment surrounding one or more components of the air dehumidification system (1), or the air dehumidifier (2). The controller (67) can be respectively coupled to one or more temperature sensors (70) and/or one or more humidity sensors (71) and/or one or more airflow sensors (72) that can be respectively located inside the first chamber (7) and/or the second chamber (10) adapted to or configured to generate a signal that varies with change in the first chamber temperature (FCT) and/or humidity (FCH), and/or second chamber temperature (SCT) and/or humidity (SCH). The controller (67) can include a processor (73) communicatively coupled to a non-transitory computer readable memory (74) containing an air dehumidification algorithm (75) (also referred to as the "algorithm") under control of the processor (73) to analyze the signal from each sensor (68, 69, 70, 71, 72,) to measure one or more of: the ambient atmosphere temperature (AT), the ambient atmosphere humidity (AH), the first chamber temperature (FCT) and/or first chamber humidity (FCH), the second chamber temperature (SCT) and/or second chamber humidity (SCH), and combinations thereof.

The first chamber temperature (FCT) and/or first chamber humidity (FCH) measurements and/or the second chamber temperature (SCT) and/or the second chamber humidity (SCH) and the ambient atmosphere temperature (AT) and/or ambient atmosphere humidity (AH) measurements can be used under the control of the controller (67) implementing the air dehumidification algorithm (75) to adjust operating parameters of the air dehumidification system (1) or air dehumidifier (2) with respect to one or more of: reconfiguration of the reconfigurable airflow path (28) connecting the plurality of modules (3) in the adsorption mode (AM) between allocating the supply airflow (6) in parallel or in ordered series to each of the plurality of modules (3); reconfiguration of the reconfigurable airflow path (28) to dispose one or more of the plurality of modules (3) in the desorption mode (DM) with the remaining ones of the plurality of modules (3) disposed in the adsorption mode (AM); the period of time allocated to adsorption mode (AM) in which the supply airflow (6) flows over the water capture material (4) whether in parallel or in series; the temperature of in the first chamber (7)(FCT) during the desorption mode (DM) and the period of time allocated to the desorption mode (DM); the temperature of the second chamber (10) (SCT) during the condensation mode (CM) and the period of time allocated to the condensation mode (CM); operation of the air circulator (14) to adjust airflow rate (AFR) to the plurality of modules in the adsorption (AM); operation of the air circulator (14) to adjust airflow rate (AFR) between the first chamber (7) and the second chamber (10), and in particular embodiments, control operation of the heat pump (20) and/or the pre-cooler (43).

As can be easily understood from the foregoing, the basic concepts of the present invention may be embodied in a variety of ways. The invention involves numerous and varied embodiments of an air dehumidification system (1), an air dehumidifier (2) and methods for making and using such air dehumidification system (1) and air dehumidifier (2) including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "air dehumidifier" should be understood to encompass disclosure of the act of "air dehumidifying"—whether explicitly discussed or not—and, conversely, were there is a disclosure of the act of "air dehumidifying", such a disclosure should be understood to encompass disclosure of a "air dehumidifier" and even a "means for air dehumidifying". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the air dehumidifying systems or air dehumidifiers herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A dehumidification system, comprising:
a plurality of modules each containing a water capture material, wherein said water capture material adsorbs water from a supply airflow in an adsorption mode, wherein said plurality of modules in said adsorption mode fluidically coupled in series to receive said supply airflow;
a first chamber configured to fluidically couple to one or more of said plurality of modules; and
a heating source thermally coupled to said first chamber, said heating source operable to heat an airflow circulated through said first chamber fluidically coupled to one or more of said plurality of modules to desorb water vapor from said water capture material during a desorption mode, wherein one or more of said plurality of modules concurrent operates in said adsorption mode as one or more of said plurality of modules operates in said desorption mode.

2. The system of claim 1, further comprising:
a second chamber fluidically coupled to said first chamber; and
a cooling source thermally coupled to said second chamber, said cooling source operable to cool an airflow recirculated between said first chamber and said second chamber to condense said water vapor during a condensation mode.

3. The system of claim 1, further comprising a discharge airflow from said plurality of modules in said adsorption mode, said discharge airflow has an absolute humidity less than said supply airflow.

4. The system of claim 3, wherein said discharge airflow has an absolute humidity in a range of about 0.0035 g/m$^3$ to about 0.3500 g/m$^3$.

5. The system of claim 1, further comprising a discharge airflow from said plurality of modules in said adsorption mode, said discharge airflow at about 20° C. (about 68° F.) having a relative humidity less than said supply airflow at about 20° C. (about 68° F.).

6. The system of claim 5, wherein said discharge airflow at about 20° C. (about 68° F.) has a relative humidity in the range of about 0.02% to about 20%.

7. The system of claim 1, further comprising a discharge airflow from said plurality of modules in said adsorption mode, said discharge airflow having a dew point less than said supply airflow.

8. The system of claim 7, wherein said discharge airflow has a dew point in a range of about −30° C. (about −22° F.) to about −70° C. (−94° F.).

9. The system of claim 1, wherein said plurality of modules in said adsorption mode fluidically coupled in series deliver said supply airflow from a first of said plurality of modules containing water capture material having greatest water saturation to a last of said plurality of modules containing water capture material having least water saturation.

10. The system of claim 1, wherein said first chamber fluidically couples to one of said plurality of modules containing water capture material having greatest water saturation.

11. The system of claim 1, wherein each of said plurality of modules fluidically coupled to an adsorption airflow inlet and an adsorption airflow outlet, wherein said adsorption airflow inlet and said adsorption airflow outlet remain open during said adsorption mode.

12. The system of claim 11, wherein each of said plurality of modules fluidically coupled to a desorption airflow inlet and a desorption airflow outlet, wherein said desorption airflow inlet and said desorption airflow outlet remain open and wherein said adsorption airflow inlet and said adsorption airflow outlet remain closed during said desorption mode.

13. The system of claim 11, further comprising an airflow distribution valve configured to open said adsorption airflow inlet and said adsorption airflow outlet of said plurality of modules and close said desorption airflow inlet and said desorption airflow outlet during said adsorption mode.

14. The system of claim 13, wherein said airflow distribution valve configured to fluidically couple said plurality of modules in said adsorption mode to receive said supply airflow in series.

15. The system of claim 14, wherein said airflow distribution valve configured to deliver said airflow through said plurality modules in said adsorption mode from a first of said plurality of modules containing water capture material having greatest water saturation to a last of said plurality of modules containing water capture material having least water saturation.

16. The system of claim 1, wherein each of said plurality of modules fluidically coupled to a valved adsorption airflow inlet and a valved adsorption airflow outlet, wherein said valved adsorption airflow inlet and said valved adsorption airflow outlet remain open during said adsorption mode.

17. The system of claim 16, wherein each of said plurality of modules fluidically coupled to a valved desorption airflow inlet and a valved desorption airflow outlet, wherein said valved desorption airflow inlet and said valved desorption airflow outlet remain open and wherein said valved adsorption airflow inlet and said valved adsorption airflow outlet remain closed during said desorption mode.

18. The system of claim 16, further comprising a controller including a processor communicatively coupled to a non-transitory computer readable memory containing an operating specification executable to control operation of said valved adsorption airflow inlet, said valved adsorption airflow outlet, said valved desorption airflow inlet, and said valved desorption airflow outlet of each of said plurality of modules.

19. The system of claim 18, wherein said controller operable to close said valved adsorption airflow inlet and said valved adsorption airflow outlet, and to open said valved desorption airflow inlet and said valved desorption airflow outlet to fluidically couple said one of said plurality of modules to said first chamber during said desorption mode, and wherein controller operable to open said valved adsorption airflow inlet and said valved adsorption airflow outlet and close said valved desorption airflow inlet and said valved desorption airflow outlet of said plurality of modules in said adsorption mode.

20. The system of claim 19, wherein said controller operable to fluidically couple said plurality of modules in said adsorption mode in series to receive said supply airflow.

21. The system of claim 20, wherein said controller configured to deliver said supply airflow through said plurality modules in absorption mode from a first of said plurality of modules containing water capture material having greatest water saturation to a last of said plurality of modules containing water capture material having least water saturation.

22. The system of claim 1, further comprising a controller including a processor communicatively coupled to a non-transitory computer readable memory containing a dehumidification algorithm under control of said processor to analyze a signal from one or more ambient atmosphere temperature sensors and/or one or more ambient atmosphere humidity sensors, which varies based on one or more of: supply airflow temperature and/or supply airflow humidity.

23. The system of claim 2, further comprising a controller including a processor communicatively coupled to a non-transitory computer readable memory containing a computer code under control of said processor to analyze a signal from one or more airflow temperature sensors and/or one or more airflow humidity sensors, and/or airflow rate sensor which varies based on change of one or more of: an airflow temperature, an airflow humidity, and an airflow rate of said airflow circulated through said first chamber coupled to said one or more of said plurality of modules in said desorption mode and/or said airflow recirculated between said first chamber and said second chamber in said condensation mode.

24. The system of claim 23, wherein said controller based on analysis of said signal operates to control one or more of: said heat source, said cooling source, and at least one air circulator to generate said airflow circulated between said first chamber and said one or more of said plurality of modules in said desorption mode and/or said airflow recirculated between said first chamber and said second chamber in said condensation mode.

25. The dehumidification system of claim 1, further comprising a pre-cooler disposed to pre-cool the supply airflow delivered to said plurality of modules each containing said water capture material.

26. The dehumidification system of claim 2, further comprising a pre-cooler disposed to pre-cool a discharge airflow delivered from said plurality of modules each containing said water capture material.

* * * * *